US012440594B2

(12) United States Patent
Obrist et al.

(10) Patent No.: US 12,440,594 B2
(45) Date of Patent: Oct. 14, 2025

(54) GENERATING OLFACTORY EXPERIENCES

(71) Applicant: THE UNIVERSITY OF SUSSEX, Brighton (GB)

(72) Inventors: Marianna Obrist, Brighton (GB); Emanuela Maggioni, Brighton (GB); Robert Cobden, Brighton (GB)

(73) Assignee: UNIVERSITY OF SUSSEX, Brighton (GB)

(*) Notice: Subject to any disclaimer, the term of this patent is extended or adjusted under 35 U.S.C. 154(b) by 1123 days.

(21) Appl. No.: 17/049,949

(22) PCT Filed: Apr. 23, 2019

(86) PCT No.: PCT/GB2019/051138
§ 371 (c)(1),
(2) Date: May 13, 2021

(87) PCT Pub. No.: WO2019/207298
PCT Pub. Date: Oct. 31, 2019

(65) Prior Publication Data
US 2021/0346562 A1    Nov. 11, 2021

(30) Foreign Application Priority Data
Apr. 23, 2018    (GB) .................................... 1806562

(51) Int. Cl.
*A61L 9/12*      (2006.01)
*G05B 19/04*     (2006.01)
(Continued)

(52) U.S. Cl.
CPC ............ *A61L 9/125* (2013.01); *G05B 19/041* (2013.01); *G05B 19/0423* (2013.01); *G06F 16/9035* (2019.01); *A61L 2209/111* (2013.01)

(58) Field of Classification Search
CPC .............. A61L 9/125; A61L 2209/111; A61L 2209/11; A61L 9/14; A61L 9/035;
(Continued)

(56) References Cited

U.S. PATENT DOCUMENTS

2005/0160789 A1\* 7/2005 Freyer .................... A61L 9/125
422/85
2010/0168878 A1 7/2010 Hoonhout
(Continued)

OTHER PUBLICATIONS

Communication pursuant to Article 94(3) EPC, dated Mar. 10, 2023, U.S. Appl. No. 17/049,949, corresponding to U.S. Appl. No. 17/049,949.
(Continued)

*Primary Examiner* — Kamini S Shah
*Assistant Examiner* — Mohammed Shafayet
(74) *Attorney, Agent, or Firm* — Pearl Cohen Zedek Latzer Baratz LLP

(57) ABSTRACT

A system (100) for generating an olfactory experience comprises a user interface (120) that allows a user to provide a set of input parameters that define a desired olfactory experience. The system (100) further comprises a set of processing modules (104) that convert the set of input parameters into a set of scent delivery instructions for one or more scent delivery devices (106), (108) to follow. The system \*100) can allow a variety of desired olfactory experiences to be indicated by a user and then allow those desired olfactory experiences (or suitable approximations or equivalents thereof) to be provided by a variety of scent delivery devices that may be available to the system (100).

21 Claims, 14 Drawing Sheets

(51) Int. Cl.
*G05B 19/042* (2006.01)
*G06F 16/9035* (2019.01)

(58) Field of Classification Search
CPC .............. G05B 19/041; G05B 19/0423; G06F 16/9035; G06Q 10/00
See application file for complete search history.

(56) References Cited

U.S. PATENT DOCUMENTS

| | | | |
|---|---|---|---|
| 2014/0324222 A1* | 10/2014 | Chee | H03M 7/14 |
| | | | 700/265 |
| 2015/0019029 A1* | 1/2015 | Chandler | B05B 12/02 |
| | | | 700/283 |
| 2015/0019030 A1* | 1/2015 | Chandler | A45D 34/02 |
| | | | 700/283 |
| 2016/0231720 A1* | 8/2016 | Choi | A61L 9/125 |
| 2017/0023923 A1 | 1/2017 | Chandler | |
| 2017/0131689 A1* | 5/2017 | Chan | H04W 4/80 |

OTHER PUBLICATIONS

GB Search Report dated Oct. 24, 2018, GB Patent Application No. GB1806562.3.
PCT Search Report dated Jul. 3, 2019, PCT Patent Application No. PCT/GB2019/051138.
PCT International Preliminary Report on Patentability dated Oct. 27, 2020, PCT Patent Application No. PCT/GB2019/051138.
Communication pursuant to Article 94(3) EPC, dated Dec. 10, 2024, EP Application No. 19719620.7, pp. 1-9.

\* cited by examiner

GENERATING OLFACTORY EXPERIENCES

The technology described herein relates to systems for and methods of generating olfactory experiences.

An olfactory experience is an experience had by a person when perceiving one or more scent stimuli, such as a mixture and/or series of scents, and can be either a conscious or sub-conscious experience. For a user to perceive a scent, its molecules must reach the user's olfactory receptors. This can be achieved through either static delivery methods such as natural advection or diffusion (i.e. the odour is not actively transported, e.g. is release from a jar or scratch card), or dynamic diffusion (i.e. the odour is actively transported, e.g. using pressurised air or a fan).

A device which can provide scent stimuli may be referred to as a scent delivery device ("SDD") and the resultant perception of one or more scent stimuli by a user provides an olfactory experience for that user. However, scent delivery devices typically have limited capabilities, which can restrict the range of olfactory experiences that can be generated by a given scent delivery device. Providing a scent delivery device with a wider range of capabilities is not always feasible, particularly in systems where size and/or weight are a consideration. Scent delivery devices can also suffer from limitations such as lingering scents and cross-contamination of scents.

Furthermore, while other modalities for human-computer interaction (HCI), such as vision, hearing, and touch are supported with well-established interaction techniques, such support generally does not exist for the sense of smell. Most work on generating olfactory experiences for HCI typically results in one-off applications to enhance multimedia, gaming, virtual reality, etc. . . . There are also isolated attempts to use scent delivery devices for health and well-being or for educational purposes. However, these olfactory experiences are generally limited by, and then restricted to, the particular scent delivery devices intended to provide those olfactory experiences.

The Applicants believe that there remains scope for improvements in generating olfactory experiences.

An embodiment of the technology described herein comprises a system for providing scent delivery instructions for generating an olfactory experience, the system comprising:

mapping circuitry operable to map a set of input parameters that define a desired olfactory experience to a set of one or more scent stimuli, wherein the mapping is based on the capabilities of one or more scent delivery devices intended to provide the desired olfactory experience; and a scent delivery device interface operable to provide a set of scent delivery instructions that correspond to the set of one or more scent stimuli to the one or more scent delivery devices.

Another embodiment of the technology described herein comprises a computer implemented method of providing scent delivery instructions for generating an olfactory experience, the method comprising:

mapping a set of input parameters that define a desired olfactory experience to a set of one or more scent stimuli, wherein the mapping is based on the capabilities of one or more scent delivery devices intended to provide the desired olfactory experience; and providing, e.g. via a scent delivery device interface, a set of scent delivery instructions that correspond to the set of one or more scent stimuli to the one or more scent delivery devices.

In the technology described herein, a set of input parameters that define a desired olfactory experience are mapped to a set of one or more scent stimuli based on the capabilities of one or more scent delivery devices intended to provide the desired olfactory experience. This can help to ensure that the one or more delivery devices that are available to the system are actually capable of providing the one or more scent stimuli for the olfactory experience. A set of scent delivery instructions corresponding to the one or more scent stimuli are then provided to the one or more scent delivery devices for the one or more scent delivery devices to follow. This can, for example, allow suitable (e.g. suitably formatted and/or ordered) instructions to be provided to the particular scent delivery device or devices that are available to the system. The technology described herein can therefore allow a variety of desired olfactory experiences to be indicated, e.g. by a user, and then allow those desired olfactory experiences (or suitable approximations or equivalents thereof) to be provided by a variety of scent delivery devices that may be available to the system.

The set of input parameters that define the desired olfactory experience may be provided to the mapping circuitry in a data structure, which may be referred to herein as an input parameter descriptor. The set of input parameters that define the desired olfactory experience may indicate any desired and suitable properties of that desired olfactory experience. For example, the set of input parameters may indicate one or more properties of the desired olfactory experience selected from the group consisting of: one or more desired scents; one or more desired temporal properties (start time, end time, duration, repetition frequency, etc.); one or more desired spatial properties (location, direction, etc.); one or more desired intensity properties; one or more desired scent categories (e.g. association categories, event categories, emotion categories, etc.); and one or more desired emotion values (e.g. valence, arousal, anger, disgust, fear, happiness, sadness, surprise, etc., values).

The term "scent" used herein may refer to one or more (e.g. a mixture of) chemical compounds or elements that can interact with the human olfactory system. The term "emotion value" used herein may refer to the degree to which a user feels that emotion in response to the olfactory experience. The term "valence value" used herein may refer to the degree to which a user reacts positively or negatively to the olfactory experience. The term "arousal value" used herein may refer to the degree to which a user is energised or calmed by the olfactory experience.

In embodiments, the system may further comprise a user interface operable to allow a user to provide the set of input parameters that define the desired olfactory experience. Thus, embodiments may comprise providing, e.g. via a user interface, the set of input parameters that define the desired olfactory experience. This may, for example, allow a user to provide the desired properties of the olfactory experience, e.g. substantially independently of the particular scent delivery device or devices that will actually provide the olfactory experience.

In embodiments, the user interface may comprise a graphical user interface (e.g. displayed on a display screen) and/or one or more input devices, such as a keyboard, computer mouse, touch screen, microphone, one or more buttons, one or more levers, one or more dials, one or more switches, etc.

The user interface may be operable to allow the user to create and/or modify (e.g. one or more plots that describe) the desired olfactory experience, e.g. over time and/or space. A plot may relate to a particular property for the desired olfactory experience, such as intensity, emotion (e.g. valence, arousal, etc.), etc., e.g. over time and/or space.

A plot may comprise one or more nodes. A node may indicate one or more values for a desired property of the olfactory experience. The one or more values may comprise one or more of: an intensity value; an emotion value (e.g. a valence value, an arousal value, etc.); a temporal value; a spatial value; etc. . . . A node may be moved, created and/or deleted by the user. A node may be movable by the user so as to alter the one or more values for the desired property indicated by that node.

In embodiments, plural properties for the desired olfactory experience (e.g. intensity, emotion (e.g. valence, arousal, etc.), etc.) may be provided by a multidimensional measure or vector. For example, a valence value and an arousal value may be provided by a two dimensional measure or vector indicating valence and arousal. For another example, other emotion values may be provided by an even higher (e.g. six) dimensioned measure or vector, e.g. indicating anger, disgust, fear, happiness, sadness, surprise, etc.

A plot may also or instead relate to one or more events to be indicated by (and, e.g., that trigger the output of one or more stimuli of) the desired olfactory experience. In embodiments, the set of scent delivery instructions may be provided to the one or more scent delivery devices in response to an event. In these embodiments, the system may determine that a particular event has occurred, and then provide instructions to the one or more scent delivery devices to output one or more scent stimuli corresponding to that particular event. An event may comprise the receipt of a communication, such as an email, telephone call, text message, etc., a value (e.g. a speed value) rising above or falling below a threshold value, such as a speed limit, etc. . . . The one or more stimuli may also indicate the type of event, e.g. with a particular scent or scent mixture associated with the event. The one or more stimuli may also indicate the urgency or importance of the event, e.g. with higher intensity, valence, and/or arousal stimuli for a more urgent or important event and/or lower intensity, valence, and/or arousal stimuli for a less urgent or important event.

As discussed above, in the technology described herein, the mapping of the set of input parameters to the set of one or more scent stimuli is based on the capabilities of one or more scent delivery devices intended (and, e.g., available) to provide the desired olfactory experience. For example, the mapping may attempt to provide the desired olfactory experience, but within the limits of the capabilities of the one or more scent delivery devices intended (and, e.g., available) to provide the desired olfactory experience. For example, the mapping may be based on one or more (e.g. chemical and/or physical and/or perceptual) properties of one or more scents or scent mixtures available for output by the one or more scent delivery devices.

The mapping may, for example, comprise one or more of: mapping a desired scent to an available scent or scent mixture; mapping a desired scent category to an available scent or scent mixture; mapping a desired temporal property to an achievable temporal property; mapping a desired spatial property to an achievable spatial property; mapping a desired intensity property or value to an achievable intensity property or value and/or to an available scent and/or available scent mixture having that intensity property or value; and mapping a desired emotion property or value to an achievable emotion property or value and/or to an available scent and/or available scent mixture having that emotion property or value (e.g. mapping a desired valence property or value to an achievable valence property or value and/or to an available scent and/or available scent mixture having that valence property or value, mapping a desired arousal property or value to an achievable arousal property or value and/or to an available scent and/or available scent mixture having that arousal property or value, etc.).

The capabilities of a scent delivery device may be provided to the mapping circuitry in a data structure, which may be referred to herein as a scent delivery device descriptor. The capabilities of a scent delivery device may be indicated in any desired and suitable way. For example, the capabilities of a scent delivery device may be indicated in terms of one or more of: one or more specific scents available for output by the scent delivery device; a number of scents that can be output by the scent delivery device; one or more physical states (e.g. solid, powder, gel, liquid, gas, etc.) of the scents available for output by the scent delivery device; the scent mixing capabilities (e.g. none, ratio based mixing, available ratio ranges for mixing, etc.) of the scent delivery device; the intensity regulation capabilities (none, intensity regulation based on delivery parameters, intensity regulation based on chemistry, etc.) of the scent delivery device; one or more temporal scent output capabilities (lag time from instruction to output of a stimulus, minimum duration for a stimulus, maximum duration for a stimulus, repetition frequency for a stimulus) of the scent delivery device; one or more spatial scent output capabilities (available output location(s) (e.g. indicated by one or more coordinates), available output direction(s) (e.g. indicated by one or more vectors), available range or reach, etc.) of the scent delivery device; one or more scent delivery methods (e.g. static, dynamic, etc.) of the scent delivery device; a clean air delivery capability (e.g. yes or no) of the scent delivery device; an arrangement of scent delivery channels (e.g. separate, combined, etc.) of the scent delivery device; and one or more dynamic scent delivery capabilities (e.g. quantity (volume or weight), flowrate, velocity, consumption rate, etc.) of the scent delivery device.

A specific scent or scent mixture may have one or more chemical properties and/or physical properties, such as one or more constituent scent compounds, one or more chemical formulae; one or more chemical shapes; one or more diffusion characteristics; and one or more concentrations. A specific scent or scent mixture may have one or more perceptual properties, such as one or more perceived intensities; one or more perceptual threshold intensities, one or more descriptive properties; one or more scent category properties; one or more emotion properties (e.g. one or more valence properties, one or more arousal properties, etc.). A perceptual property may be determined though scientific study of a group of users and their reactions to scents and/or scent compounds and/or may be deduced from the chemistry of the scent or scent compound.

A specific scent may be indicated using a data structure, which may be referred to herein as a scent descriptor. A scent descriptor may indicate one or more of: a scent identifier; a scent name; one or more perceptual effects, and one or more scent compounds. A scent compound may in turn be indicated using a data structure, which may be referred to herein as a scent compound descriptor. A scent compound descriptor may indicate one or more of: a compound name; a chemical formula; a chemical shape; a diffusion characteristic; a concentration; and one or more perceptual effects.

A perceptual effect may in turn be indicated using a data structure, which may be referred to herein as a perceptual effect descriptor. A perceptual effect descriptor for a scent or scent compound may indicate one or more of: a perceived intensity value; a perceptual threshold intensity value, one or more descriptive keywords; one or more scent categories; one or more emotion values (e.g. a valence value, an arousal value, etc.). As indicated above, a perceptual effect may be determined though scientific study of a group of users and their reactions to scents and/or scent compounds and/or may be deduced from the chemistry of the scent or scent compound.

The capabilities of the one or more scent delivery devices may be provided to the mapping circuitry in any desired and suitable way. For example, one or more of the capabilities of the one or more scent delivery devices may be obtained by the mapping circuitry from a database or library of capabilities for different types of scent delivery devices.

One or more capabilities of the one or more scent delivery devices may also or instead be obtained (e.g. by the scent delivery device interface) by interrogating the one or more scent delivery devices themselves, e.g. either to obtain the capabilities of the scent delivery device directly and/or to obtain the type of scent delivery device. The type of scent delivery device can then be used (e.g. by the mapping circuitry or scent delivery device interface) to obtain the capabilities of that type of scent delivery device indirectly from a database or library.

Thus, the system (e.g. mapping circuitry and/or scent delivery device interface) may be operable to obtain one or more scent delivery capabilities of the one or more scent delivery devices from a database or library of scent delivery capabilities for a set of plural possible types of scent delivery device and/or from the one or more scent delivery devices themselves.

The mapping circuitry may further be operable to map the set of input parameters that define the desired olfactory experience to the set of one or more scent stimuli based on a user profile, e.g. for a or the user of the system. The user profile may be provided to the mapping circuitry in a data structure, which may be referred to herein as a user profile descriptor. The user profile may, for example, indicate one or more of: a mapping between one or more scents and one or more corresponding associated events that is specific to a user of the system; a mapping between one or more scents and a corresponding perceptual descriptor that is specific to a user of the system. The perceptual descriptor may indicate one or more of: a perceived intensity value for the scent that is specific to a user; a perceptual threshold value for the scent that is specific to a user; one or more associations for the scent that are specific to a user; one or more descriptive keywords for the scent that are specific to a user; one or more emotion values for the scent that are specific to a user (e.g. a valence value for the scent that is specific to a user, an arousal value for the scent that is specific to a user, etc.). This use of a user profile can help to account for the various idiosyncrasies of users.

A scent stimulus provided by the mapping circuitry may take any desired and suitable form. A scent stimulus may be provided by the mapping circuitry using a data structure, which may be referred to herein as a scent stimulus descriptor. A scent stimulus may be defined in any desired and suitable way. For example, a scent stimulus may be defined in terms of one or more properties selected from a group consisting of: one or more specific scents for the stimulus; one or more temporal properties (start time, end time, duration, repetition frequency) for the stimulus; one or more spatial properties (location, direction, range or reach) for the stimulus; and one or more intensity or dynamic delivery properties (concentration, volume or mass, velocity, flowrate) for the stimulus.

In embodiments, the system may further comprise control (e.g. scheduling) circuitry operable to generate, from the set of one or more scent stimuli, the set of scent delivery instructions for the one or more scent delivery devices to follow. Thus, embodiments may further comprise generating, from the set of one or more scent stimuli, the set of scent delivery instructions for the one or more scent delivery devices to follow.

The scent delivery instructions can take any desired and suitable form. There may be a one-to-one correspondence between stimuli and scent delivery instructions, but this is not essential. A scent delivery instruction may be provided, e.g. by the control circuitry and/or to the scent delivery device interface, in a data structure, which may be referred to herein as a scent delivery instruction descriptor. A scent delivery instruction may take any desired and suitable form. For example, a scent delivery instruction may comprise one or more of: an instruction identifier, one or more specific scents; one or more temporal instructions (e.g. start time, end time, duration, repetition frequency, etc.); one or more spatial instructions (e.g. location, direction, range, etc.); and one or more intensity or dynamic delivery instructions (e.g. concentration, volume or mass, velocity, flowrate, etc.).

The control circuitry may be further operable to determine the presence of one or more scheduling conflicts in the set of one or more scent stimuli. A scheduling conflict may, for example, comprise a temporal and/or spatial and/or chemical conflict, such as a temporal and/or spatial and/or chemical overlap, adjacency or interference between stimuli in the set of one or more scent stimuli.

The control circuitry may be further operable to resolve one or more scheduling conflicts in the set of one or more scent stimuli. For example, the control circuitry may perform one or more of: cancelling one or more (e.g. lower priority) conflicting scent stimuli; temporally shifting one or more (e.g. lower priority) conflicting scent stimuli; reducing the duration of one or more (e.g. lower priority) conflicting scent stimuli; spatially moving one or more (e.g. lower priority) conflicting scent stimuli; and chemically altering one or more (e.g. lower priority) conflicting scent stimuli.

The system may further comprise one or more scent delivery devices operable to receive the set of instructions from the scent delivery device interface. A scent delivery device can take any desired and suitable form that is operable to provide a scent stimulus by following one or more instructions provided by the system. A scent delivery device may, for example, have any one or more or all of the possible capabilities of scent delivery devices as described above.

The scent delivery device interface may issue one or more instructions to (and obtain available capabilities from) a scent delivery device using a driver for (e.g. specific to) that device or type of device. The scent delivery device interface may issue one or more instructions to (and obtain available capabilities from) plural different scent delivery devices or device types using respective (different) drivers for those devices or device types. The scent delivery device interface may issue one or more instructions to (and obtain available capabilities from) a scent delivery device using any desired and suitable wired or wireless communications protocol, such as USB, Bluetooth, Wi-Fi, etc.

In an embodiment, the system and method of the technology described herein is used for the purpose of generating and delivering olfactory experiences in order to convey particular, in an embodiment selected, information, such as the occurrence of a particular, in an embodiment selected, event, to a user. In these arrangements, a particular, in an embodiment selected, in an embodiment predefined, piece of information, such as the occurrence of an event, to be conveyed to a user, is associated with a particular, in an embodiment selected, in an embodiment predefined olfactory experience, and, the method and system of the technology described herein is configured to generate and deliver the corresponding olfactory experience so as to convey the relevant information, such as the occurrence of the particular event, to a user, in response to a desire (a trigger) to convey the particular information to the user (such as the relevant event occurring).

Thus, in embodiments, the method comprises, and the system is configured to, generating the olfactory experience in order to convey particular information to a user.

The information that is to be conveyed to a user in these embodiments can comprise any suitable and desired information. In an embodiment, the information to be conveyed comprises an indication of the occurrence of an event, such as an alarm, the receipt of an e-mail, an alert, etc. . . . In an embodiment, the information to be conveyed is also or instead (and in an embodiment also) descriptive of an event (comprises a description of an event), such as an indication of the importance of an event that has occurred, the source of the event, etc. . . . In an embodiment, the method comprises and the system is operable to, provide a (e.g. combined) olfactory experience that is both indicative of the occurrence of an event and otherwise descriptive of the event.

In an embodiment, there are a plurality of different particular, in an embodiment selected, in an embodiment predefined, sets (pieces) of information, such as events and/or descriptions of events, that can be conveyed to a user, with each type (set or piece) of information (e.g. event and/or event description) having a corresponding associated olfactory experience that should be generated when it is desired to convey the information in question to a user.

Thus, in embodiments, the method comprises, and the system is operable to, providing a set of scent delivery instructions to a set of one or more scent delivery devices for generating an olfactory experience that is indicative of (that is associated with) information to be conveyed to a user.

Thus, the method may comprise, and the system may be operable to, determining whether there is information to be conveyed to a user and, when it is determined that there is information to be conveyed to a user, providing a set of scent delivery instructions to one or more scent delivery devices for generating an olfactory experience that is indicative of (that is associated with) the information to be conveyed to the user.

In other words, the method may comprise, and the system may be operable to, in response to determining that there is information to be conveyed to a user, providing a set of scent delivery instructions to one or more scent delivery devices for generating an olfactory experience that is indicative of the information to be conveyed.

Thus, in embodiments, determining that there is information to be conveyed to a user triggers the generation of an olfactory experience that is indicative of (associated with) the information to be conveyed. For example, and in an embodiment, an olfactory experience may be generated in response to an event, to thereby provide a notification or alert of that event to a user.

The fact that there is information to be conveyed to a user (to thereby trigger the generation of the desired olfactory experience) can be determined in any suitable and desired manner. For example, the system may receive inputs from one or more associated systems/devices, such as associated alarms, a device running an e-mail application, etc., to indicate that there is information to be conveyed to a user for which an olfactory experience should be generated, with the method and system then determining that there is information to be conveyed to a user (and the information that is to be conveyed to the user) accordingly (in response to receiving the input to that effect). Thus the system may comprise, for example, a circuit for receiving an indication(s) that a particular event(s) has occurred (and, e.g., in an embodiment, description(s) of those events), and to, in response thereto, determine that there is information to be conveyed to the user, and the information that is to be conveyed to the user, using an olfactory experience.

Thus, in embodiments, the system determines there is information to be conveyed to a user in response to receiving an indication that there is information to be conveyed to a user.

In embodiments, the system comprises circuitry for determining whether there is information to be conveyed, such as for determining whether an event has occurred.

The olfactory experience that is generated to convey particular information to the user can be selected and configured as desired. In an embodiment, a (and each) particular information to be conveyed is associated with a particular, in an embodiment selected, in an embodiment predefined, olfactory experience. The olfactory experience that is associated with particular information to be conveyed (and the properties of that olfactory experience) may be, for example, pre-set (predefined) in the system, and/or the association between olfactory experiences and particular information to be conveyed may be able to be set and/or changed by a user in use, if desired.

The particular olfactory experience that is associated with particular information to be conveyed can be selected and set as desired. For example, the properties of an olfactory experience associated with particular information to be conveyed may be based on a natural association between an olfactory experience and the information to be conveyed, and/or on an arbitrary or otherwise selected association, such as a user-selected association, between the information to be conveyed and the olfactory experience that is delivered.

For example, the concept of "fresh" in information to be conveyed may be associated with a lemon scent based on a natural association between "fresh" and a lemon scent.

Additionally or alternatively, a user may, for example, select and set a particular scent, such as a lemon scent, to be associated with receiving an email and another scent, such as a peppermint scent, to be associated with their boss, such that, to convey the information that the user has received an email from their boss, an olfactory experience that is intended to cause the user to perceive a lemon scent and a peppermint scent would be generated.

In embodiments, associations between information to be conveyed and properties of an olfactory experience may be predefined and a user may learn these associations over time.

In embodiments, associations between information to be conveyed and properties of an olfactory experience may be specific to a particular user.

In embodiments, a user profile for a user may comprise associations specific to that user.

Information to be conveyed may be associated with any desired olfactory experience property or properties, such as one or more of: one or more scents; one or more temporal properties; one or more spatial properties; and one or more intensity values, of an olfactory experience.

In embodiments, information to be conveyed may be associated with zero or more olfactory experience properties. For example, information to be conveyed may be associated with a plurality of scents or, in an alternative example, information to be conveyed may be associated with a particular scent and/or a particular temporal property. Properties of an olfactory experience may be associated with, and indicative of, zero or more properties of information to be conveyed and/or a plurality of different information to be conveyed. Hence, in embodiments, there are a set of single-to-many, many-to-single, and/or many-to-many relationships between information to be conveyed and properties of an olfactory experience that are used when generating an olfactory experience indicative of information to be conveyed.

In embodiments, in order to generate the desired olfactory experience(s), respective sets (pieces) of information to be conveyed are associated with their own respective sets of input parameters that define the corresponding olfactory experience that is indicative of the information to be conveyed, with the method then comprising, and the system being operable to, mapping the set of input parameters corresponding to the information to be conveyed to a set of one or more scent stimuli, with the set of one or more stimuli then being used to generate and provide a set of scent delivery instructions to one or more scent delivery devices to provide the desired olfactory experience indicative of the information to be conveyed.

Thus, in an embodiment, the system comprises input parameter determining circuitry that is configured to determine a set of input parameters that correspond to (that are associated with) information to be conveyed, and to provide that set of input parameters to the mapping circuitry for use to generate the desired olfactory experience to convey the information to a user.

In an embodiment, the method comprises, and the system is configured to, in response to determining a need to convey to a user a piece of information that is associated with a respective olfactory experience: determining a set of input parameters that define the olfactory experience that is associated with the piece of information to be conveyed to a user; mapping the determined set of input parameters to a set of one or more scent stimuli; and providing a set of scent delivery instructions that correspond to the set of one or more scent stimuli to the one or more scent delivery devices to deliver the olfactory experience that is associated with the piece of information to a user.

The input parameter(s) that is associated with particular information to be conveyed could be an input parameter that is specific to that information, such as an "e-mail" input parameter (that is then associated with a desired set of scent stimuli), and/or the input parameters could be input parameters that correspond to desired properties of the olfactory experience corresponding to particular information to be conveyed, such as an input parameter corresponding to a "lemon" scent, etc.

The input parameter(s) that is associated with particular information to be conveyed can be determined in any suitable and desired manner.

In one embodiment the (and each particular) set of information to be conveyed has a predefined association with a corresponding set of input parameters (which association may be pre-set and/or set by a user in use, for example). Additionally or alternatively, particular information to be conveyed may be associated with a particular set of olfactory experience properties (as discussed above), with the system then being operable to determine a set of input parameters corresponding to the olfactory experience properties associated with the information in question, so as to thereby generate an olfactory experience having the properties that are associated with the information to be conveyed. Again, the particular properties for the olfactory experience for the information to be conveyed could be predefined, and/or settable by a user in use, etc.

The set of input parameters that correspond to (that are associated with) information to be conveyed may therefore be determined using predefined associations (that may be pre-set and/or set by a user in use, for example) between the piece(s) of information to be conveyed and input parameter(s). Additionally or alternatively, determining the set of input parameters that correspond to (that are associated with) information to be conveyed may comprise determining a set of input parameters that correspond to olfactory experience properties associated with the information in question and, in an embodiment, this is performed using predefined associations (that may be pre-set and/or set by a user in use, for example) between the information in question and one or more properties of an olfactory experience.

Thus, in an embodiment, determining a set of input parameters that define an olfactory experience that is associated with a piece of information to be conveyed comprises determining at least one of: one or more input parameters that correspond to the piece of information to be conveyed; and/or one or more input parameters that correspond to one or more olfactory experience properties associated with the information to be conveyed.

Other arrangements would, of course, be possible.

The technology described herein may be implemented by any suitable system, such as a suitably configured computer and/or micro-processor based system. Thus, in some embodiments, the technology described herein is implemented by a computer and/or micro-processor based system.

The technology described herein can be implemented in a wide range of olfactory-enhanced systems, such as entertainment, health care, retail, automotive, educational, etc., systems. For example, the system may comprise or form part of an entertainment system (such as a television, media player or computer games console), a medical device, a portable electronic device (such as a smartphone, tablet or laptop computer), an automobile, etc.

In embodiments, the system comprises, and/or is in communication with, one or more memories and/or memory devices that store the data described herein, and/or that store software for performing the processes described herein.

The various functions of the technology described herein can be carried out in any desired and suitable manner. For example, the functions of the technology described herein can be implemented in hardware or software, as desired. Thus, for example, unless otherwise indicated, the various functional elements, stages, modules, interfaces, and "means" of the technology described herein may comprise or be implemented by a suitable processor or processors, controller or controllers, functional units, circuitry, circuits, processing logic, microprocessor arrangements, etc., that are operable to perform the various functions, etc., such as appropriately dedicated hardware elements (processing circuitry/circuits) and/or programmable hardware elements (processing circuitry/circuits) that are programmed to operate in the desired manner.

It should also be noted here that, as will be appreciated by those skilled in the art, the various functions, etc., of the technology described herein may be duplicated and/or carried out in parallel on a given processor. Equally, the various processing elements, stages, modules, means, etc., may share processing circuitry, processing circuits, etc., if desired.

It will also be appreciated by those skilled in the art that all of the described embodiments of the technology described herein can include, as appropriate, any one or more or all of the features described herein.

The methods in accordance with the technology described herein may be implemented at least partially using software, e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a processor or other system comprising data processor causes in conjunction with said data processor said processor or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described by way of example only and with reference to the accompanying drawings, in which:

Like reference numerals are used for like components where appropriate in the drawings.

FIG. 1 shows an overview of a computer implemented system 100 for generating an olfactory experience.

Figure 1:
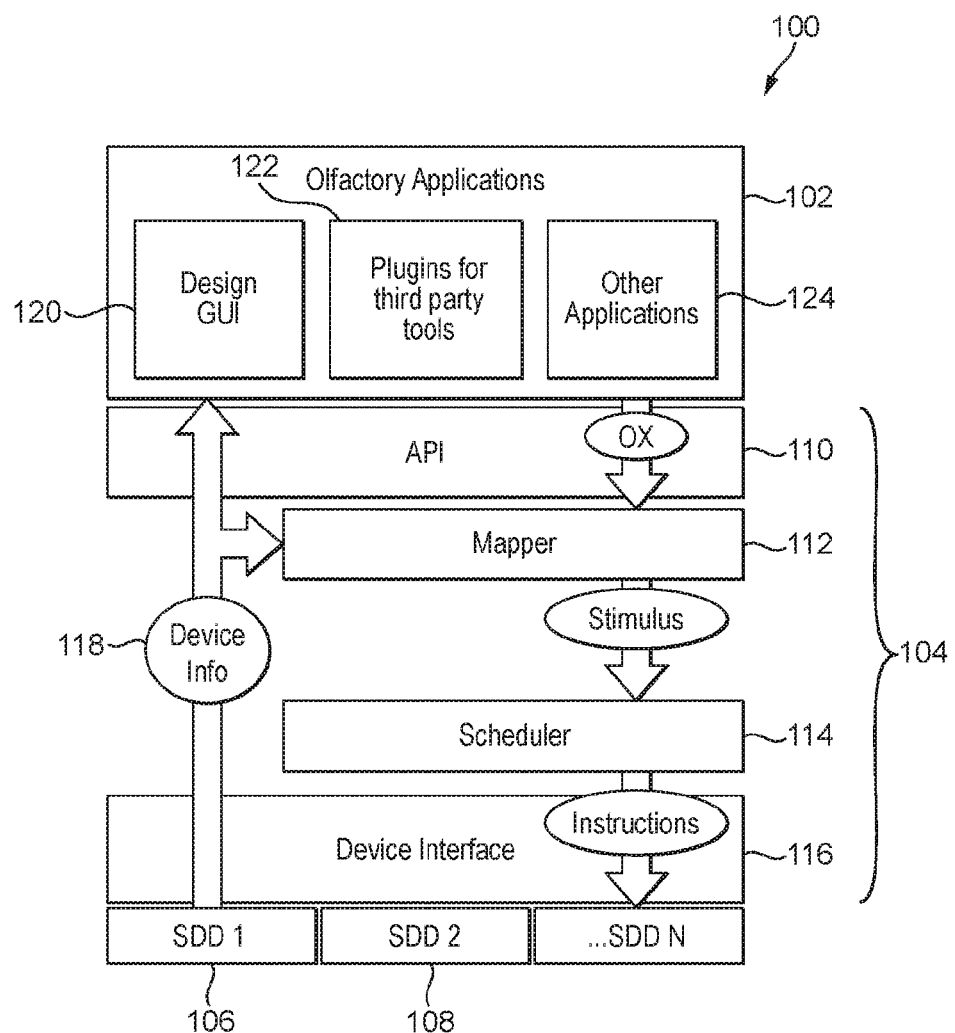
FIG. 1 shows an overview of a system for generating an olfactory experience in accordance with an embodiment of the technology described herein.

In this embodiment, the system 100 comprises circuitry that runs one or more olfactory applications 102. An olfactory application may, for example, implement a graphical user interface 120 by which a user can provide a set of input parameters that define a desired olfactory experience. The graphical user interface 120 may be displayed on any desired and suitable display screen and manipulated by the user using any desired and suitable input device(s), such as a keyboard, mouse, touch screen, etc. Other olfactory applications, e.g. for defining or triggering a desired olfactory experience, may be provided as desired, e.g. via plugins for third party tools 122 and/or other applications 124.

The system 100 further comprises circuitry that implements a set of processing modules 104. The processing modules 104 convert the set of input parameters into a set of scent delivery instructions to be followed by scent delivery devices 106, 108 of the system 100.

In this embodiment, the set of processing modules 104 comprises an application programming interface (API) 110 that receives the set of input parameters defining the desired olfactory experience from the olfactory application(s) 102 and provides the set of input parameters to circuitry that implements a mapping module 112. In this embodiment, the API 110 can also provide feedback to the olfactory application(s) 102 to allow the provision of the set of input parameters that define the desired olfactory experience to be a dynamic process, e.g. based on the current capabilities of the available scent delivery devices 106, 108. For example, if a very high intensity stimulus is desired by the user but none is available, then this may be fed back to the user via the API 110 and olfactory application(s) 102. The user may accordingly have to select a lower intensity, e.g. via the user interface 120.

The mapping module 112 then maps the set of input parameters to a set of scent stimuli that are capable of being generated by the available scent delivery devices 106, 108. The mapping module 112 then provides the set of scent stimuli to circuitry that implements a control module, which in this embodiment takes the form of a scheduling module 114. The scheduling module 114 then detects and resolves any scheduling conflicts in the set of scent stimuli and schedules the output of the scent stimuli by providing instructions to be followed by the scent delivery devices 106, 108.

The instructions are then provided, via a uniform scent delivery device interface 116, to the scent delivery devices 106, 108. The uniform scent delivery device interface 116 can also obtain information 118 relating to the type and/or capabilities of the scent delivery devices 106, 108. Providing a uniform scent delivery device interface 116 can allow the system to interact with a variety of different types of scent delivery devices 106, 108.

When performing the above processes, the processing modules 104 can make use of a database or library (not shown) that comprises data descriptors for scents, user profiles, and scent delivery devices, etc.

The instructions provided to the scent delivery devices 106, 108 are then followed by the scent delivery devices 106, 108 in order to generate the scent stimuli for the olfactory experience.

Figure 2:
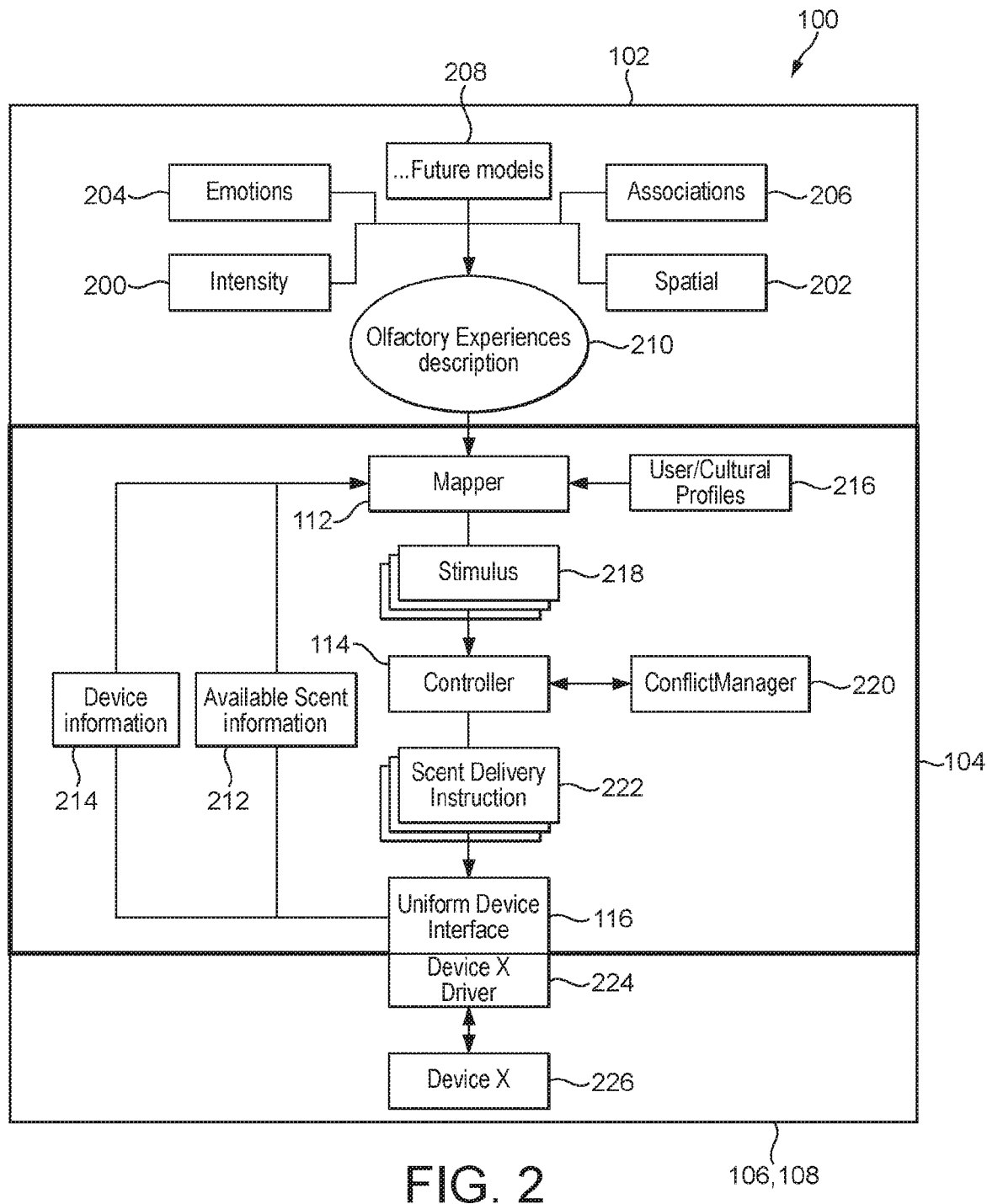
FIG. 2 shows further details of the system for generating an olfactory experience as shown in FIG. 1.

FIG. 2 shows further details of the system 100 of FIG. 1. As is shown in FIG. 2, the olfactory application(s) 102 can take, as inputs for the desired olfactory experience, an indication of one or more desired intensity properties 200 for the olfactory experience, an indication of one or more desired spatial properties 202 for the olfactory experience, an indication of one or more desired emotions 204 for the olfactory experience to invoke in the user, an indication of one or more desired associations 206 for the olfactory experience to cause the user to make, and/or other parameters 208 that may be provided based on future models for olfactory-based HCI. Together these inputs provide a set of input parameters 210 that describe the desired olfactory experience.

Figure 3A:
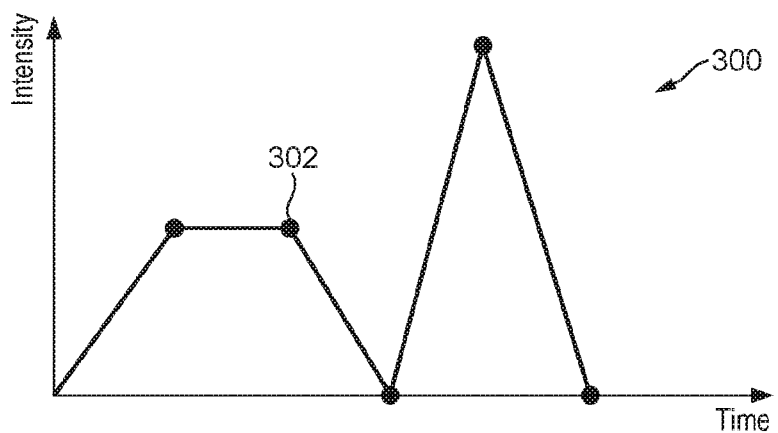
FIGS. 3A-3C show various graphical user interfaces for providing input parameters for desired olfactory experiences in accordance with embodiments of the technology described herein.
Figure 3B:
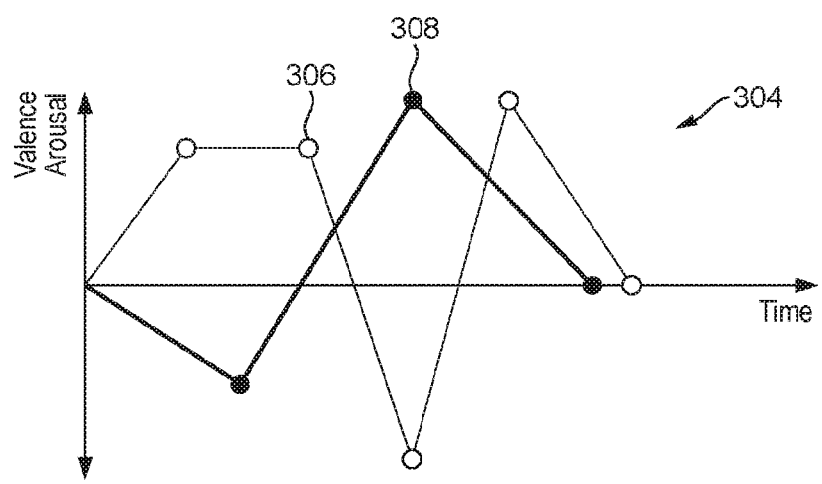
Figure 3C:
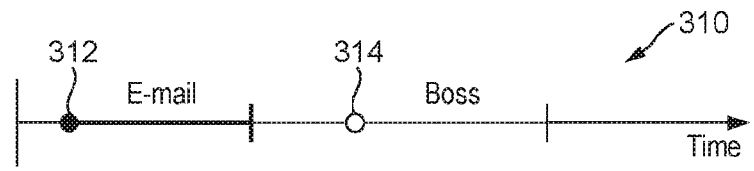

FIG. 3A-3C show various graphical user interfaces for providing input parameters for desired olfactory experiences using the olfactory application(s) 102.

FIG. 3A shows a plot 300 of perceived intensity (on an arbitrary scale of 0-100%) versus time that can be displayed on a graphical user interface and manipulated by the user. In this embodiment, the user can alter the intensity-time profile for the olfactory experience by moving one or more existing nodes (e.g. node 302) of the profile, either to increase or decrease the node's value and/or to move the node backwards or forwards in time. The user can also or instead alter the intensity-time profile for the olfactory experience by deleting one or more of the existing nodes and/or by creating one or more new nodes. The plot 300 accordingly provides a convenient and intuitive way for the user to provide a set of input parameters that define the desired olfactory experience over time. In this embodiment, the set of input parameters can, for example, comprise a set of times and corresponding intensity values.

FIG. 3B shows a plot 304 of valence and arousal (on an arbitrary scale of −100 to +100) versus time that can be displayed on a graphical user interface and manipulated by the user. The valence-time profile is shown with a lighter line and the arousal-time profile is shown with a darker line. The valence profile relates to the degree to which a user experiences a positive or negative reaction to the olfactory experience over time. The arousal profile relates to the degree to which a user experiences an energising or calming reaction to the olfactory experience over time. Other emotions, such as anger, disgust, fear, happiness, sadness, surprise, etc., could be plotted in a similar way.

Again, the user can alter the valence-time profile and/or the arousal-time profile for the olfactory experience by moving one or more existing nodes (e.g. nodes 306, 308), either to increase or decrease the node's value and/or to move the node backwards or forwards in time. The user can also or instead alter the valence-time profile and/or the arousal-time profile for the olfactory experience by deleting one or more of the existing nodes and/or creating one or more new nodes. The plot 304 accordingly again provides a convenient and intuitive way for the user to provide a set of input parameters that define the desired olfactory experience over time. In this embodiment, the set of input parameters can comprise a set of times and corresponding valence and arousal values. The emotion values may, for example, be provided as a multidimensional measure or vector.

FIG. 3C shows a plot 310 of start times and durations relating to particular events that can be displayed on a graphical user interface and manipulated by the user. In this embodiment, following a detected event at time zero, an associated stimulus for that event is provided to the user at the indicated start time and for the indicated duration on the plot. In this embodiment, a first start time 312 and duration for a first stimulus are associated with an email being received and a second start time 314 and duration are associated with a communication (in this case an email) received from the user's boss. In this embodiment, the first stimulus associated with "email" comprises a lemon scent and the second stimulus associated with "boss" comprises a peppermint scent. These associations can be chosen by the user and/or learned by the user over time. Different scents, e.g. for associating with other events, can be selected and/or learned as desired.

In this embodiment, the user can also alter the position of each start time and the corresponding duration for an event by moving the start and/or end nodes on the plot. The plot 310 accordingly again provides a convenient and intuitive way for the user to provide a set of input parameters that define a desired olfactory experience. In this embodiment, the set of input parameters can comprise a set of start times and corresponding duration values for each stimulus. Then, when a given event occurs, an appropriate stimulus can be provided at the indicated start time (e.g. relative to the time at which the event occurs) and for the corresponding duration.

Referring again to FIG. 2, the mapping module 112 can take as inputs the set of input parameters 210 that define the desired olfactory experience, a set of capabilities for the scent delivery devices 106, 108 of the system (in the form of available scent information 212 and available device information 214), and a user profile 216. Based on these inputs, the mapping module 112 provides a set of stimuli 218.

Figure 4:
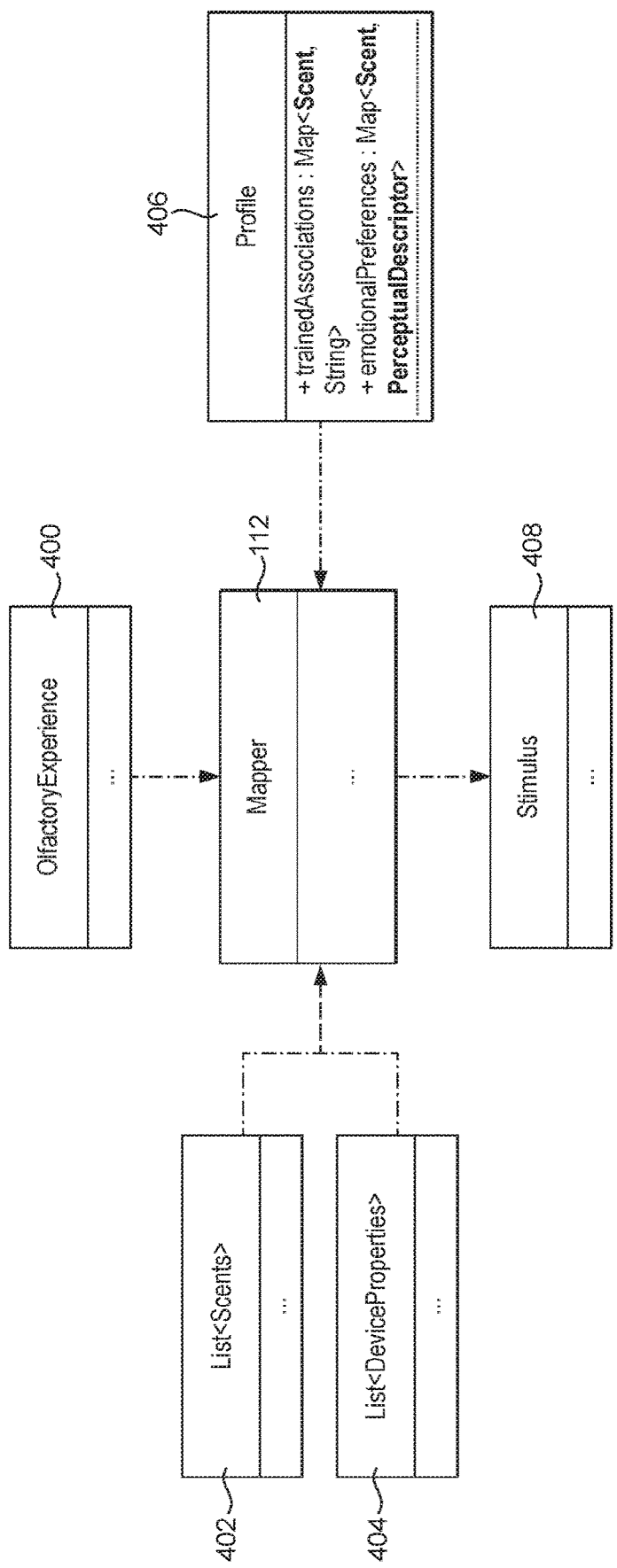
FIG. 4 shows further details of the data structures involved in a mapping process in accordance with an embodiment of the technology described herein.

FIG. 4 shows further details of the data structures (data descriptors) involved in the mapping process. As indicated above, the mapping module 112 takes an input parameter descriptor 400, which contains the set of input parameters which define the desired olfactory experience, as an input.

Figure 5:
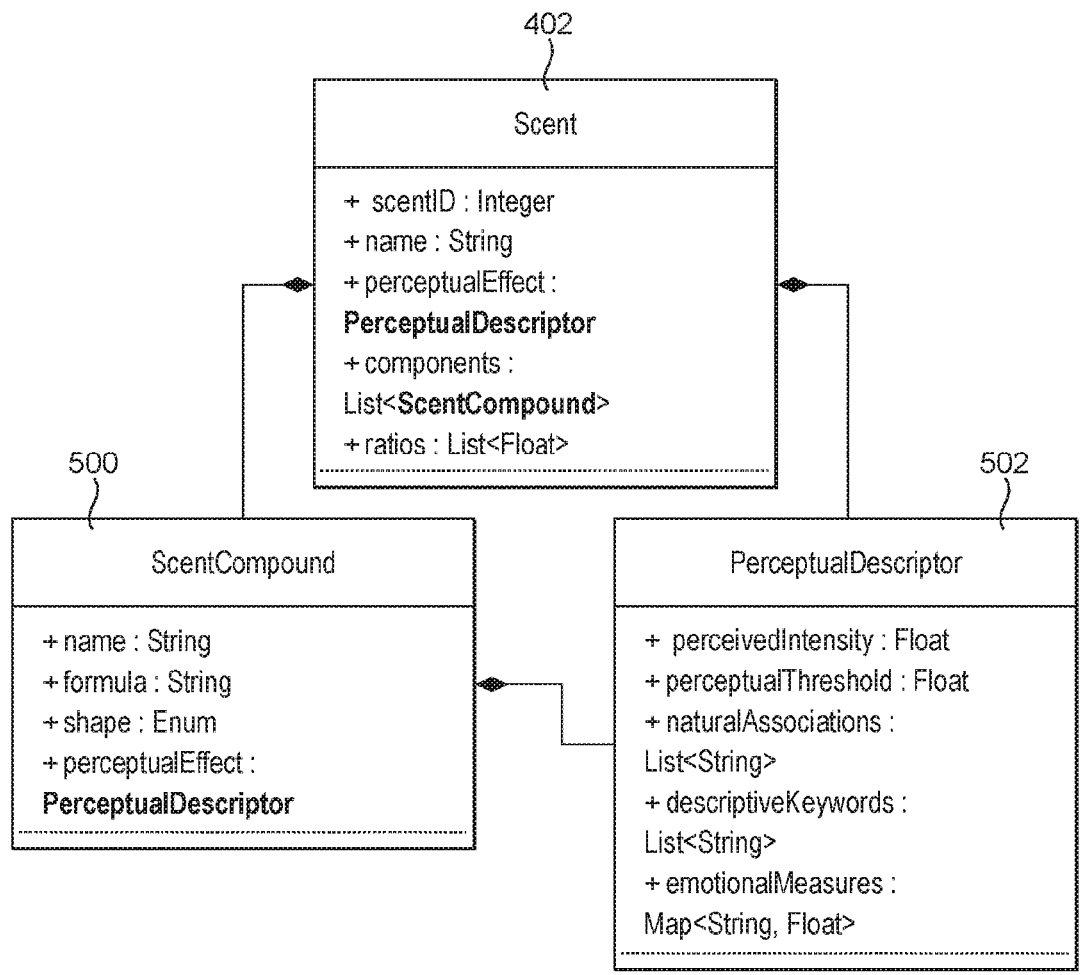
FIG. 5 shows a scent descriptor in accordance with an embodiment of the technology described herein.

The mapping module 112 also takes a list of scent descriptors 402 for the available scents as an input. FIG. 5 shows a scent descriptor 402 for a scent in more detail. In this embodiment, the scent descriptor 402 comprises an identifier for the scent, a name for the scent, a reference to an overall perceptual descriptor 502 for the scent, one or more references to scent compound descriptors 500 for the scent, and ratios for the compounds of the scent.

In this embodiment, the scent compound descriptor 500 indicates a name for the compound, a chemical formula for the compound, a molecule shape for the compound, and a perceptual descriptor for the compound per se.

In this embodiment, the perceptual effect descriptor 502 indicates a perceived intensity value for the scent or compound, a perceptual threshold value for the scent or compound, a list of natural associations for the scent or compound (e.g. "lemon" for a lemony scent, etc.), a list of descriptive keywords for the scent or compound (e.g. "fresh" for a lemony scent, etc.), and a list of emotional measures for the scent or compound (e.g. valence=0.7, arousal=0.6, happiness=0.8, anger=0.1, etc.).

It should be noted here that a mixture of scent compounds, with each scent compound having its own perceptual effect, can result in a different perceptual effect for the overall scent of the mixture. Thus, in this embodiment, a perceptual descriptor is indicated both for an overall scent mixture and for each of the scent compounds that form the scent mixture.

Referring again to FIG. 4, as indicated above, the mapping module 112 also takes, as an input, a list of scent delivery device descriptors 404 for the available devices of the system.

Figure 6:
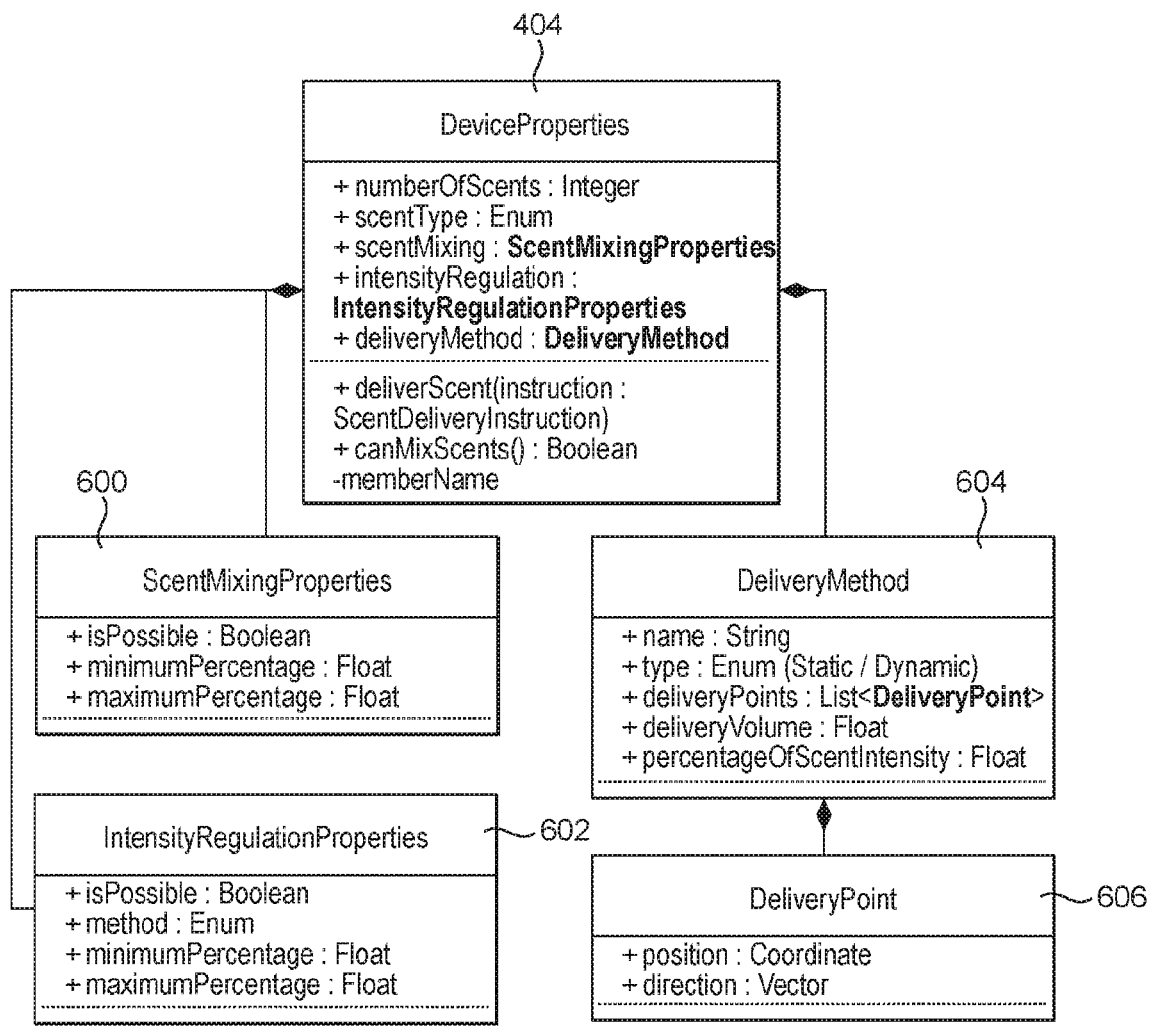
FIG. 6 shows a scent delivery device descriptor in accordance with an embodiment of the technology described herein.

FIG. 6 shows a scent delivery device descriptor 404 for a device in more detail. In this embodiment, the scent delivery device descriptors 404 indicates a number of scents for the device, a scent type (e.g. solid, powder, gel, liquid, gas), a reference to a scent mixing properties descriptor 600 for the device, a reference to an intensity regulation properties descriptor 602 for the device, and a reference to a delivery method descriptor 604 for the device.

In this embodiment, the scent mixing properties descriptor 600 comprises a Boolean value indicating whether or not scent mixing is possible, a minimum mixing percentage, and a maximum mixing percentage. The intensity regulation properties descriptor 602 indicates a Boolean value indicating whether or not intensity regulation is possible, an intensity regulation method, a minimum intensity regulation percentage, and a maximum intensity regulation percentage.

In this embodiment, the delivery method descriptor 604 indicates a name for the delivery method, a type for the delivery method (e.g. static or dynamic), one or more references to delivery point descriptors 606, a delivery volume value, and a percentage of scent intensity value. The delivery point descriptor 606 indicates a coordinate for the delivery point and a direction vector for delivery of the scent.

In this embodiment, when the device is in use, the scent delivery device descriptor 404 also comprises the scent delivery instructions provided for that device.

Referring again to FIG. 4, the mapping module 112 also takes a user profile descriptor 406 for the user as an input. In this embodiment, the user profile descriptor 406 comprises a map of selected and learned associations for the user that maps scent descriptors for particular scents to particular events (e.g. lemon=email, peppermint=boss, etc.), and a map of emotional preferences for the user that maps scent descriptors for particular scents to particular perceptual descriptors. The scent descriptors and perceptual descriptors are described above with reference to FIG. 5.

Referring again to FIG. 4, the mapping module 112 then processes the inputs and generates one or more stimulus descriptors 408. In doing this, the mapping module 112 attempts to map the set of parameters that define the desired olfactory experience to a set of stimuli that are actually capable of being generated by the scent delivery devices of the system.

For example, the mapping module 112 may select appropriate scents to match, as close as possible, parameters for a desired intensity profile based on the scents that can be output by the scent delivery devices of the system. With reference to FIG. 3A, for example, a first available scent having a lower perceived intensity (e.g. lemon) may be mapped to the initial lower peak of the profile and a second available scent having a higher perceived intensity (e.g. peppermint) may be mapped to the subsequent higher peak of the profile.

For another example, the mapping module 112 may select appropriate scents to match, as close as possible, parameters for desired valence/arousal profiles based on the scents that can be output by the scent delivery devices of the system and based on the user's profile descriptor 406. With reference to FIG. 3B, for example, one or more available scents having a higher valence and lower arousal (e.g. as far as the user is concerned) may be mapped to the initial higher valence peak and lower arousal trough, one or more scents having a lower valence and higher arousal (e.g. as far as the user is concerned) may be mapped to the subsequent lower valence trough and higher arousal peak, and so on, so as to follow the valence/arousal profiles for the desired olfactory experience. The mapping module 112 may, for example, mix scents in an attempt to provide a desired valence or arousal. For example, a scent with higher valence may be mixed with a scent of lower valence in order to provide a neutral valence.

For another example, the mapping module 112 may select a particular scent for a particular event based on the scents that can be output by the scent delivery devices of the system and based on the user's profile descriptor 406. With reference to FIG. 3C, for example, a lemon scent may be desired for an "email" event and peppermint scent may be desired for a "boss" event. However, if the desired associated scent is not available for the scent delivery devices, then the mapping module 112 may select a closely related available scent or may mix available scents in an attempt to match the desired associated scent.

Figure 7:
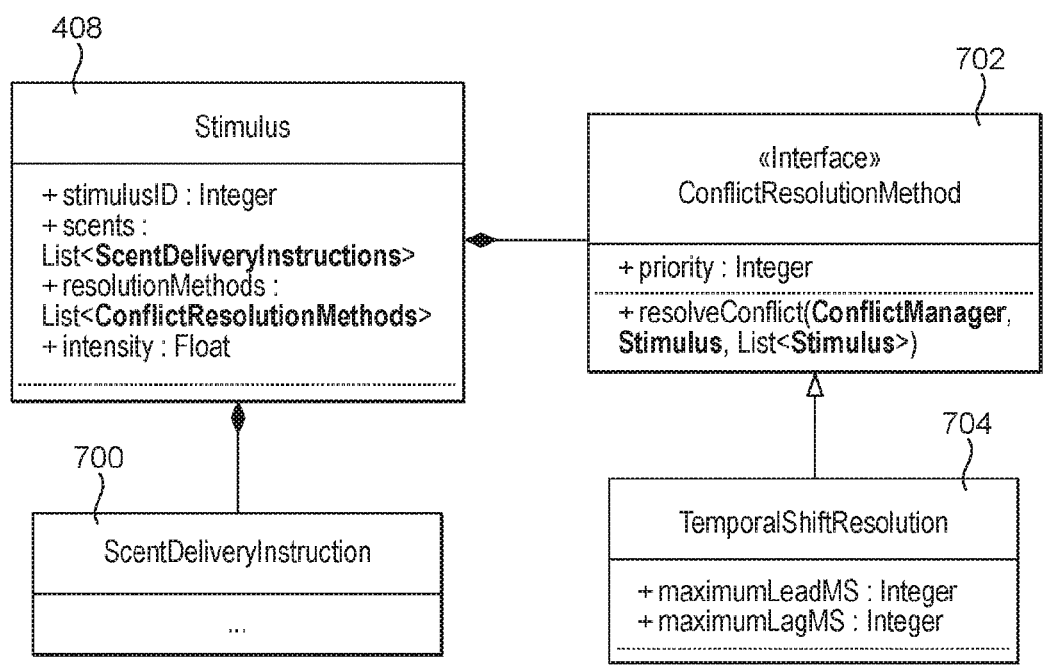
FIG. 7 shows a stimulus descriptor in accordance with an embodiment of the technology described herein.

FIG. 7 shows a stimulus descriptor 408 provided by the mapping module 112 in more detail. In this embodiment, the stimulus descriptor 408 indicates an identifier for the stimulus, a list of scent delivery instruction descriptors 700 for the stimulus, and a list of conflict resolution method descriptors 702 for the stimulus.

In this embodiment, a conflict resolution method descriptor 702 for a stimulus indicates a priority value for the stimulus. In the event that the stimulus is in conflict with another stimulus, a stimulus with a higher priority value may take precedence over a stimulus with a lower priority value.

In this embodiment, the conflict resolution methods descriptor 702 further indicates a temporal shift resolution descriptor 704, which indicates a maximum lead time value (i.e. a maximum time by which the stimulus can be shifted backwards in time) and a maximum lag time value (i.e. a maximum time by which the stimulus can be shifted forwards in time) to resolve a conflict. Thus, the conflict resolution method descriptor 702 indicates the manner in which the stimulus may be modified, e.g. without the stimulus losing its meaning.

Referring again to FIG. 2, the scheduling module 114 can take, as inputs, the set of stimuli 218 and, using a conflict managing module 220, detect and resolve any scheduling conflicts in the stimuli for the olfactory experience. The scheduling module 114 then provides a set of scent delivery instructions 222 to be followed by the scent delivery devices 106, 108 when generating the olfactory experience.

Figure 8:
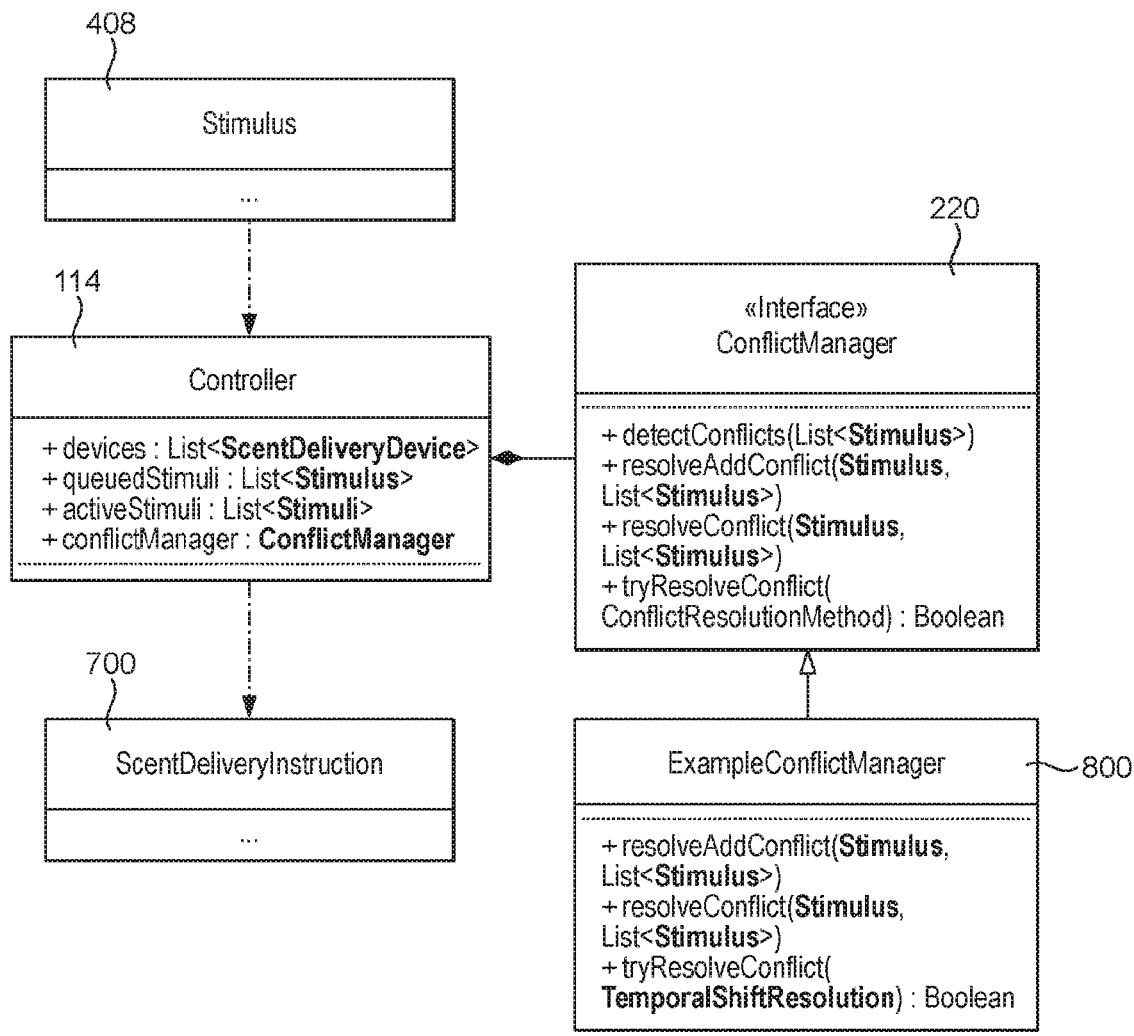
FIG. 8 shows further details of the data structures involved in a scheduling process in accordance with an embodiment of the technology described herein.

FIG. 8 shows further details of the data structures (data descriptors) involved in the scheduling process. As indicated above, the scheduling module 114 takes the set of stimulus descriptors 408 as an input. The scheduling module 114 also takes a list of scent delivery device descriptors 404 for available devices as an input. The scheduling module 114 also maintains a list of queued stimuli and a list of active stimuli.

The scheduling module 114 also interfaces with the conflict managing module 220 to detect any scheduling conflicts in the scent stimuli and resolve any scheduling conflicts in the scent stimuli using a conflict resolution method 800. In the example shown in FIG. 8, the conflict resolution method 800 comprises a temporal shift. This conflict resolution method 800 is described in more detail below. Other conflict resolution methods may be provided and used as desired.

Figure 9:
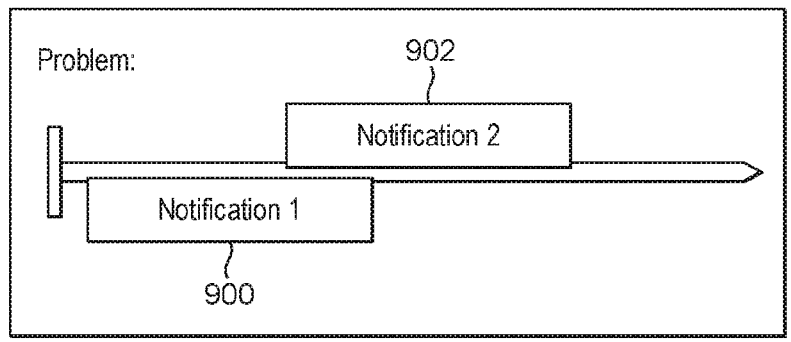
FIG. 9 shows an example of a scheduling conflict between stimuli of an olfactory experience.

FIG. 9 shows an example of a scheduling conflict between scent stimuli for an olfactory experience. In this example, a first stimulus for a first notification (e.g. email) event 900 overlaps in time with a second stimulus for a second notification (e.g. email) event 902. In this example, the scent for the first stimulus is desired to be provided at the same location as the scent for the second stimulus. The scent for the first stimulus also conflicts chemically with the scent for the second stimulus, such that the scent for the first stimulus would destructively interfere with the scent for the second stimulus. The scent stimuli would therefore lose meaning. Similar conflicts may occur in other situations, e.g. a scent delivery device may already be in the process of being used to output a first scent and therefore may be unable to output a second scent, the first and second scents may be the same and thus the occurrence of the second scent may be missed, etc. . . . Conflicts such as these may arise because the times at which the events that trigger the stimuli occur can be unpredictable in nature. For example, two events may occur simultaneously or close together in time.

Figure 10A:
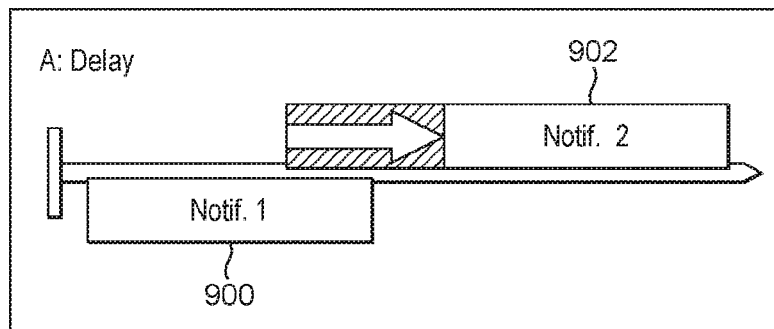
FIGS. 10A-10C shows various ways in which to resolve a scheduling conflict between stimuli of an olfactory experience in accordance with embodiments of the technology described herein.
Figure 10B:
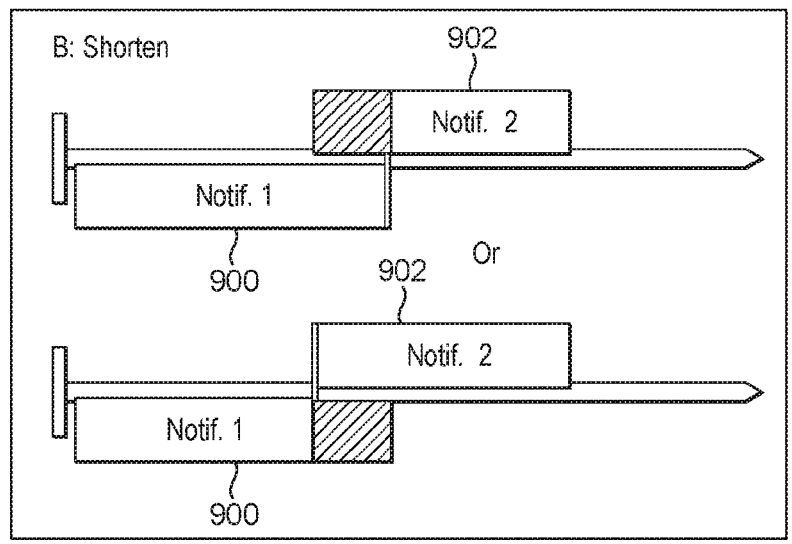
Figure 10C:
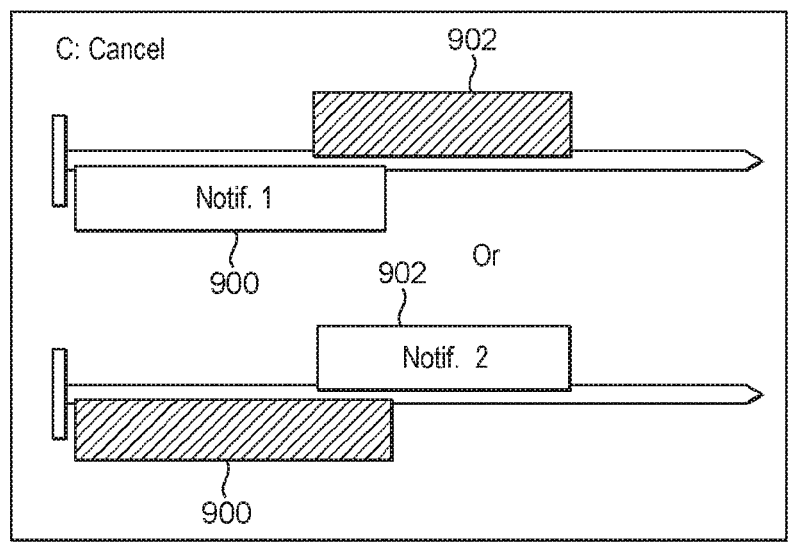

FIGS. 10A-10C show various ways in which to resolve scheduling conflicts between scent stimuli of an olfactory experience.

In FIG. 10A, the second stimulus for the second notification 902 has lower priority and is delayed, such that the first stimulus for the first notification 900 no longer overlaps in time with the second stimulus for the second notification 902.

In FIG. 10B, either the first stimulus for the first notification 900 or the second stimulus for the second notification 902 is shortened, such that the first stimulus for the first notification 900 no longer overlaps in time with the second stimulus for the second notification 902. The stimulus with the lower priority may be selected for shortening.

In FIG. 10C, either the first stimulus for the first notification 900 or the second stimulus for the second notification 902 is cancelled, such that the first stimulus for the first notification 900 no longer overlaps with the second stimulus for the second notification 902. The stimulus with the lower priority may be selected for cancelling.

Other conflict resolution methods may be used, such as selecting a different device to output a stimulus, selecting a different scent for a stimulus, selecting a different spatial location for a stimulus, etc.

Figure 11:
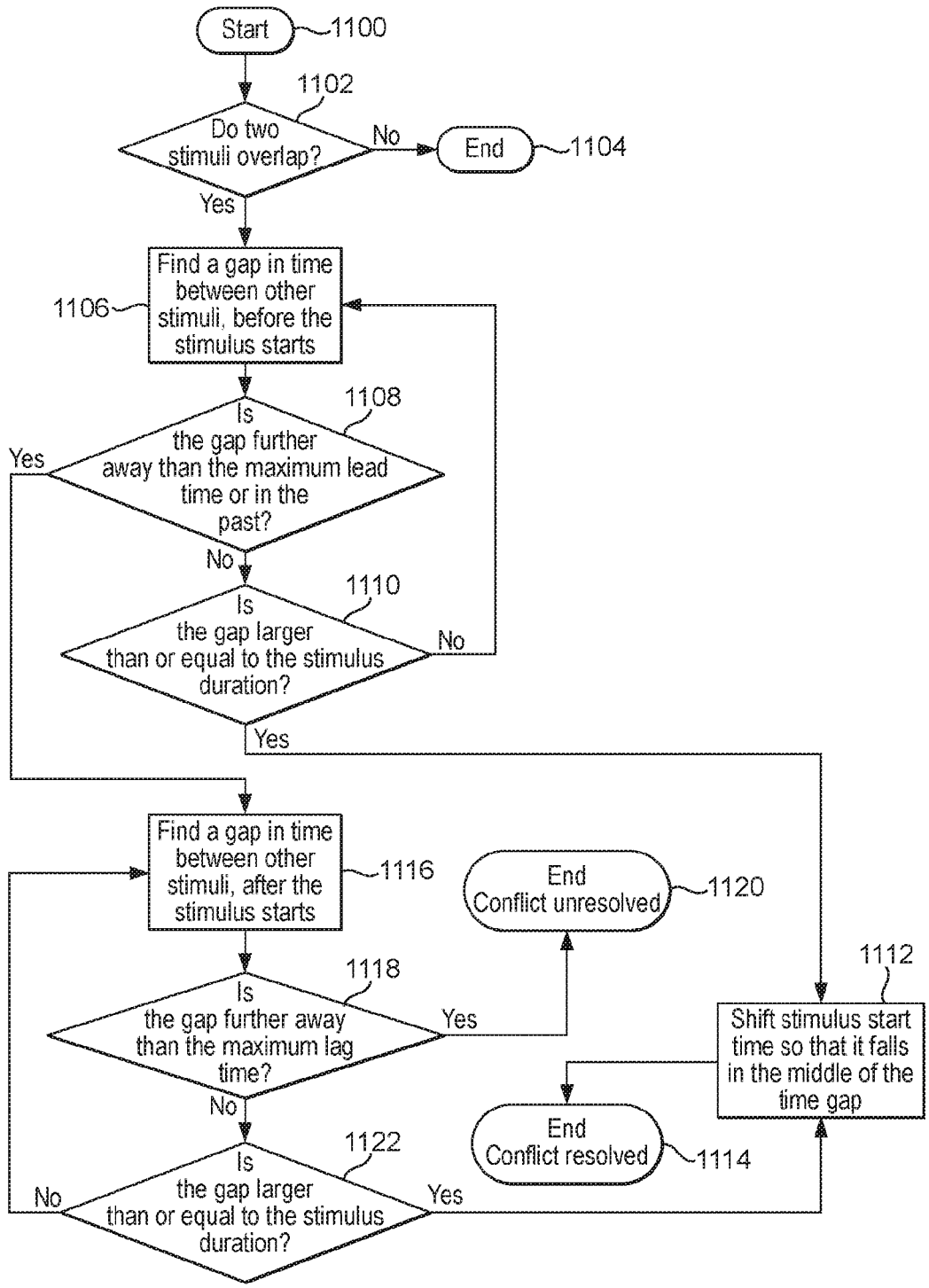
FIG. 11 shows a process of resolving a scheduling conflict between stimuli of an olfactory experience in accordance with an embodiment of the technology described herein.

FIG. 11 shows a method of resolving a scheduling conflict between scent stimuli of an olfactory experience that involves a temporal shift of a particular (e.g. lower priority) stimulus.

The method starts at step 1100. In this embodiment, at step 1102, it is determined whether two scent stimuli overlap. If two scent stimuli do not overlap then, at step 1104, the method ends without needing to resolve a conflict. If two scent stimuli do overlap, then the method proceeds to step 1106. In this embodiment, the method accordingly initially comprises detecting a scheduling conflict between scent stimuli of an olfactory experience. However, in other embodiments, e.g. in which a conflict has already been detected, steps 1102 and 1104 may be omitted.

Then, at step 1106, a gap in time is found between other scent stimuli that is before the particular (e.g. lower priority) stimulus is due to start. Then, at step 1108 it is determined whether the gap is further away than the maximum lead time for the particular stimulus or is in the past.

If the gap is not further away than the maximum lead time and is not in the past then, in step 1110, it is determined whether the gap is larger than or equal to the duration of the particular stimulus. If the gap is not larger than or equal to the stimulus duration then the method returns to step 1106 to consider another gap that is before the particular stimulus is due to start.

If the gap is larger than or equal to the stimulus duration then, in step 1112, the start of the particular stimulus is shifted to a time that places the particular stimulus in the gap. In this embodiment, the particular stimulus is shifted to the middle of the gap. However, in other embodiments, the particular stimulus can be shifted to other positions within the gap. The method then ends at step 1114 with the conflict resolved.

If the gap is further away than the maximum lead time or is in the past then, at step 1116, a gap in time is found between other scent stimuli that is after the particular (e.g. lower priority) stimulus is due to start. Then, at step 1118 it is determined whether the gap is further away than the maximum lag time for the particular stimulus.

If the gap is further away than the maximum lag time then, in step 1120, the method ends with the conflict unresolved. In this case, a different conflict resolution method may need to be considered instead.

If the gap is not further away than the maximum lag time then, in step 1122, it is determined whether the gap is larger than or equal to the stimulus duration. If the gap is not larger than or equal to the stimulus duration, then the method returns to step 1116 to consider another gap.

If the gap is larger than or equal to the stimulus duration then, at step 1112, the stimulus start time is shifted to a time that places the stimulus in the gap. Again, in this embodiment, the particular stimulus is shifted to the middle of the gap. However, in other embodiments, the particular stimulus can be shifted to other positions within the gap. The method then ends at step 1114 with the conflict resolved.

Referring again to FIG. 2, the set of scent delivery instructions 222 are then distributed, via the uniform scent delivery device interface 116, to the drivers 224 for the scent delivery devices 226 in order for each scent delivery device 226 to provide its contribution to the olfactory experience.

Figure 12:
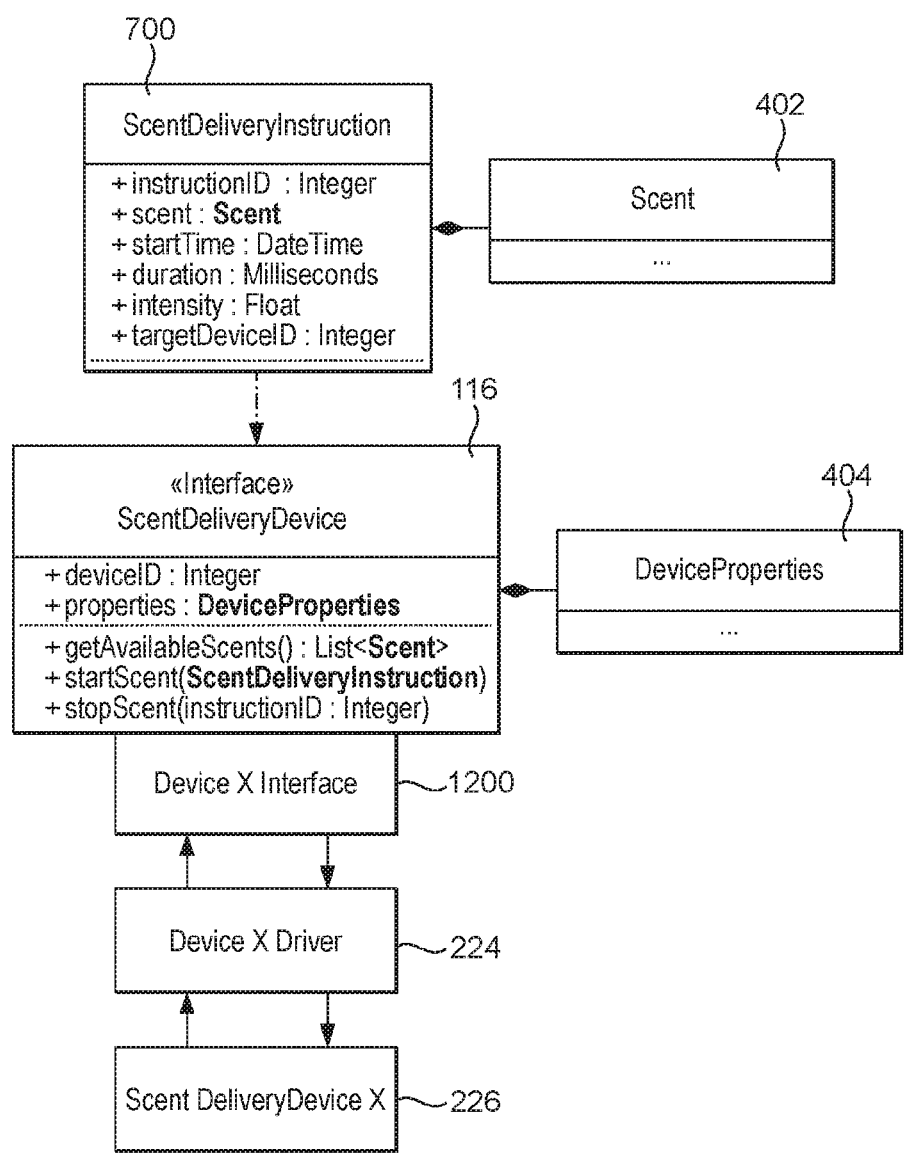
FIG. 12 shows further details of the data structures involved in interfacing with a scent delivery device in accordance with an embodiment of the technology described herein.

FIG. 12 shows further details of the data structures involved in interfacing with a scent delivery device. In this embodiment, the uniform scent delivery device interface 116 receives a scent delivery instruction descriptor 700 from the scheduling module 114. The scent delivery instruction descriptor 700 indicates an instruction identifier, a scent descriptor 402, a start time, a duration, an intensity, and a target device identifier for the instruction.

The uniform scent delivery device interface 116 then uses the target device identifier indicated in the scent delivery instruction descriptor 700 to obtain the corresponding scent delivery device descriptor 404 for that device. The uniform scent delivery device interface 116 then sends an appropriate scent delivery instruction, via a device interface 1200 and device driver 224, to the device 226 to output a scent in accordance with the scent delivery instruction. The uniform scent delivery device interface 116 can also stop the scent delivery device 226 by referencing the instruction identifier for the instruction in question.

Figure 13:
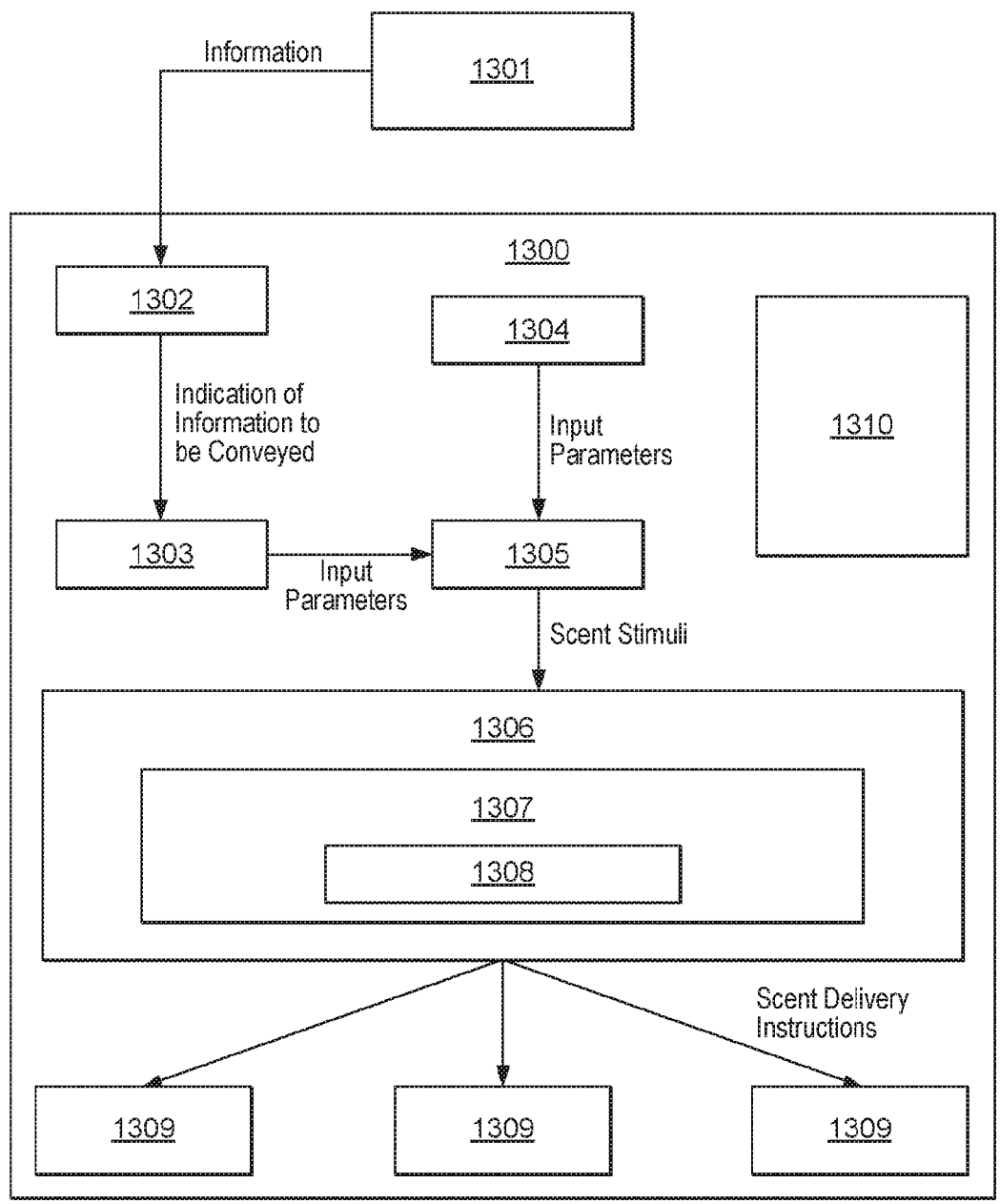
FIG. 13 shows an overview of a system for generating an olfactory experience in accordance with an embodiment of the technology described herein.

FIG. 13 shows an overview of a computer implemented system 1300 for generating an olfactory experience according to an embodiment of the technology described herein. The system 1300 may be in accordance with any of the embodiments described above. In this embodiment, the system 1300 is configured to receive information from one or more information generating modules 1301 (e.g. detectors), the system 1300 is configured to determine from the information whether or not there is a need to convey to a user information that is associated with a respective olfactory experience (e.g. so as to provide a notification or alert) and is configured to, when there is information to be conveyed, generate an olfactory experience to convey the piece of information to a user.

With continued reference to FIG. 13, the system 1300 comprises an information determining module 1302 and an input parameter determining module 1303. The information determining module 1302 is configured to receive the information from the information generating module(s) 1301 and determine whether one of one or more pieces of information that are each associated with respective olfactory experiences need to be conveyed to a user. The information determining module 1302 is configured to, when it is determined that a piece of information needs to be conveyed to a user, provide an indication of this to the input parameter determining module 1303 and, in response to the determination that a piece of information needs to be conveyed to a user, the input parameter determining module 1303 is configured to determine a set of input parameters for use to generate an associated olfactory experience in order to convey the piece of information to a user. The input parameter determining module 1303 may determine the input parameter(s) that are associated with particular information to be conveyed using, for example, predefined associations between particular pieces of information to be conveyed and corresponding input parameters and/or predefined associations between particular pieces of information to be conveyed and corresponding olfactory experience properties (the olfactory experience properties having a set of corresponding input parameters).

Continuing with reference to FIG. 13, the system 1300 comprises a mapping module 1305, scent delivery device interface 1306 and one or more scent delivery devices 1309. The mapping module 1305 is configured to receive a set of input parameters that define the olfactory experience that is associated with the piece of information to be conveyed to a user. The system 1300 may comprise a user interface 1304 in accordance with any of the embodiments described above and, in addition to input parameters received from the input parameter determining module 1303, the mapping module 1305 may also be configured to receive input parameters from the user interface 1304. The mapping module 1305 is configured to map the set of input parameters to a set of one or more scent stimuli (based on the capabilities of the one or more scent delivery devices 1309) and provide the set of one or more scent stimuli to a scent delivery device interface 1306. The scent delivery device interface 1306 is configured to generate a set of scent delivery instructions that correspond to the set of one or more scent stimuli. The scent delivery device interface 1306 may comprise a control module 1307 and/or a scheduling module 1308 that are in accordance with any of the embodiments described above. The scent delivery device interface 1306 is configured to provide the set of scent delivery instructions to one or more scent delivery devices. The one or more scent delivery devices can then deliver the olfactory experience that is associated with the piece of information to a user and the piece of information can thereby be conveyed to a user.

The system 1300 may comprise a library module 1310 for providing one or more libraries or databases that can be used when performing the various operations of the system 1300. For instance, data descriptors for any one or more of: scents; scent stimuli; perceptual effects, information to be conveyed; user profiles; and scent delivery devices may be stored in the library module and accessed and used as appropriate in accordance with any of the embodiments described above. The library module 1310 could be a memory device and comprise, for example, a physical storage medium (e.g. a ROM chip; CD ROM; RAM; flash memory; or disk) and/or could be provided by a server over a network (e.g., the Internet or World Wide Web).

Figure 14:
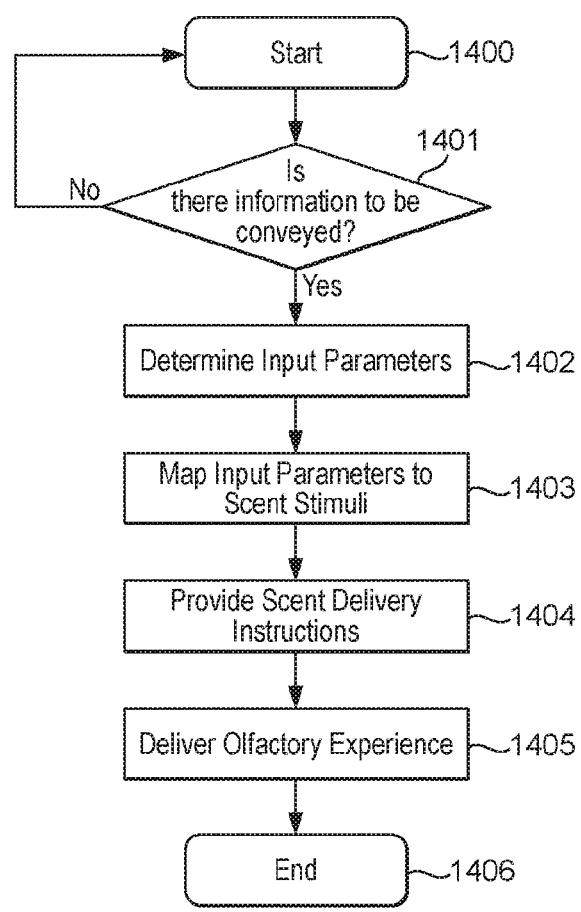
FIG. 14 shows an overview of a method of generating an olfactory experience in accordance with an embodiment of the technology described herein.

FIG. 14 shows an overview of a method of generating an olfactory experience in accordance with an embodiment of the technology described herein. The method starts at step 1400. In this embodiment, the method initially comprises, at step 1401, determining whether or not there is a need to convey to a user one or more pieces of information that are associated with a respective olfactory experience. When there is information to be conveyed to a user, the method comprises at step 1402, in response to determining there is a need to convey one of the pieces of information to a user, determining a set of input parameters that define the olfactory experience associated with the piece of information to be conveyed to a user. The set of input parameters are mapped to set of one or more scent stimuli at step 1403. At step 1404, a set of scent delivery instructions that correspond to the set of one or more scent stimuli are provided and, at step 1405, using the scent delivery instructions, an olfactory experience that is associated with the piece of information is delivered to the user. The piece of information can thereby be conveyed to the user. The method ends at step 1406.

It can be seen from the above that the technology described herein, in its embodiments at least, can allow a variety of desired olfactory experiences to be indicated, e.g. by a user, and can then allow those desired olfactory experiences (or suitable approximations or equivalents thereof) to be provided by a variety of scent delivery devices that may be available to the system. This is achieved, in the embodiments of the technology described herein at least, by providing a set of input parameters that define a desired olfactory experience, e.g. via a user interface, mapping the set of input parameters to a set of scent stimuli based on the capabilities of one or more scent delivery devices intended to provide the desired olfactory experience, generating a set of scent delivery instructions for the one or more scent delivery devices to follow from the set of scent stimuli, and then providing the set of scent delivery instructions to the one or more scent delivery devices.

Any one or more of the various functional elements of the technology described herein (such as, for instance, any of the modules or interfaces described above) could, where appropriate, communicate remotely, such as over a network (e.g. the Internet or World Wide Web). Alternatively, the functional elements could all be local to one another and/or part of a single device.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A system for providing scent delivery instructions for generating an olfactory experience, the system comprising:
a mapping circuit configured to:
map a set of input parameters that define a desired olfactory experience to a set of scent stimuli, wherein the set of scent stimuli correspond to at least one scent, and wherein the mapping is based on the capabilities of one or more scent delivery devices intended to provide the desired olfactory experience; and
provide for scent stimuli of the set of scent stimuli, conflict resolution method descriptors comprising indications of different permitted manners of modifying different ones of the scent stimuli in the event of a scheduling conflict, wherein respective ones of the conflict resolution method descriptors are provided for respective ones of the scent stimuli, and wherein respective ones of the conflict resolution method descriptors comprise one or more of:
an indication for a particular scent stimuli of a temporal shift permitted for that particular scent stimuli; an indication for a particular scent stimuli of a duration reduction permitted for that particular scent stimuli; an indication for a particular scent stimuli of a spatial movement permitted for that particular scent stimuli; and an indication for a particular scent stimuli of a chemical alteration permitted for that particular scent stimuli;
a control circuit configured to:
determine the presence of one or more scheduling conflicts in the set of scent stimuli, and to resolve the one or more scheduling conflicts in the set of scent stimuli by, based on the conflict resolution method descriptors, performing one or more of the following conflict resolution actions:
temporally shifting one or more conflicting scent stimuli;
reducing the duration of one or more conflicting scent stimuli;
spatially moving one or more conflicting scent stimuli; and chemically altering one or more conflicting scent stimuli;
and
generate a set of scent delivery instructions for the one or more scent delivery devices to follow, wherein the set of scent delivery instructions correspond to the set of scent stimuli after the one or more conflict resolution actions are performed;
and
a scent delivery device interface circuit configured to provide the set of scent delivery instructions to the one or more scent delivery devices.

2. The system of claim 1, wherein the set of input parameters indicate one or more properties of the desired olfactory experience selected from a group consisting of:
one or more desired scents; one or more desired temporal properties; one or more desired spatial properties; one or more desired intensity values; one or more desired scent categories; and one or more desired emotion values.

3. The system of claim 1, further comprising a user interface, wherein the user interface is configured to at least one of:
(i) allow a user to provide the set of input parameters that define the desired olfactory experience;
(ii) allow the user to create one or more plots that describe the desired olfactory experience; and
(iii) allow the user to modify one or more plots that describe the desired olfactory experience.

4. The system of claim 1, wherein the mapping is based on one or more properties of one or more scents or scent mixtures available for output by the one or more scent delivery devices.

5. The system of claim 1, wherein the mapping comprises one or more of:
mapping a desired scent to an available scent or scent mixture; mapping a desired scent category to an available scent or scent mixture; mapping a desired temporal property to an achievable temporal property; mapping a desired spatial property to an achievable spatial property; mapping a desired intensity value to an achievable intensity value, or to an available scent or scent mixture having that intensity value; and mapping a desired emotion value to an achievable emotion value, or to an available scent or scent mixture having that emotion value.

6. The system of claim 1, wherein the capabilities of a scent delivery device are defined in terms of one or more of:
one or more specific scents available for output by the scent delivery device; a number of scents that can be output by the scent delivery device; one or more physical states of the scents available for output by the scent delivery device; the scent mixing capabilities of the scent delivery device; one or more intensity regulation capabilities of the scent delivery device; one or more temporal scent output capabilities of the scent delivery device; one or more spatial scent output capabilities of the scent delivery device; one or more scent delivery methods of the scent delivery device; a clean air delivery capability of the scent delivery device; an arrangement of scent delivery channels of the scent delivery device; and one or more dynamic scent delivery capabilities of the scent delivery device.

7. The system of claim 1, wherein the system is configured to obtain one or more scent delivery capabilities of the one or more scent delivery devices from at least one of:
a database or library of scent delivery capabilities for a set of plural types of scent delivery device; and
the one or more scent delivery devices themselves.

8. The system of claim 1, wherein the mapping circuit is further configured to map the set of input parameters that define the desired olfactory experience to the set of scent stimuli based on a user profile.

9. The system of claim 1, wherein a scent stimulus of the set of scent stimuli is defined in terms of one or more properties selected from a group consisting of:
one or more specific scents for the stimulus; one or more temporal properties for the stimulus; one or more spatial properties for the stimulus; and one or more intensity or dynamic delivery properties for the stimulus.

10. The system of claim 1, further comprising:
a circuit configured to determine whether one of one or more pieces of information that are each associated with respective olfactory experiences needs to be conveyed to a user; and
an input parameter determining circuit configured to, in response to the determination that a piece of information of the one or more pieces of information needs to be conveyed to the user, determine a set of input parameters that define the olfactory experience that is associated with the piece of information to be conveyed, and provide that set of input parameters to the mapping circuit for use to generate the associated olfactory experience to convey the information to the user.

11. A computer implemented method of providing scent delivery instructions for generating an olfactory experience, the method comprising:
mapping a set of input parameters that define a desired olfactory experience to a set of scent stimuli, wherein the set of scent stimuli correspond to at least one scent, and wherein the mapping is based on the capabilities of one or more scent delivery devices intended to provide the desired olfactory experience;
providing for scent stimuli of the set of scent stimuli, conflict resolution method descriptors comprising indications of different permitted manners of modifying different ones of the scent stimuli in the event of a scheduling conflict, wherein respective ones of the conflict resolution method descriptors are provided for respective ones of the scent stimuli, and wherein respective ones of the conflict resolution method descriptors comprise one or more of:
an indication for a particular scent stimuli of a temporal shift permitted for that particular scent stimuli; an indication for a particular scent stimuli of a duration reduction permitted for that particular scent stimuli; an indication for a particular scent stimuli of a spatial movement permitted for that particular scent stimuli; and an indication for a particular scent stimuli of a chemical alteration permitted for that particular scent stimuli;
determining the presence of one or more scheduling conflicts in the set of scent stimuli and resolving one or more scheduling conflicts in the set of scent stimuli by, based on the conflict resolution method descriptors, performing one or more of the following conflict resolution actions:
cancelling one or more conflicting scent stimuli; temporally shifting one or more conflicting scent stimuli; reducing the duration of one or more conflicting scent stimuli; spatially moving one or more conflicting scent stimuli; and chemically altering one or more conflicting scent stimuli; and
generating a set of scent delivery instructions for the one or more scent delivery devices to follow, wherein the set of scent delivery instructions correspond to the set of scent stimuli after the one or more conflict resolution actions are performed; and
providing the set of scent delivery instructions to the one or more scent delivery devices.

12. The method of claim 11, wherein the set of input parameters indicate one or more properties of the desired olfactory experience selected from a group consisting of:
one or more desired scents; one or more desired temporal properties; one or more desired spatial properties; one or more desired intensity values; one or more desired scent categories; and one or more desired emotion values.

13. The method of claim 11, further comprising: providing, via a user interface, the set of input parameters that define the desired olfactory experience.

14. The method of claim 11, further comprising obtaining one or more scent delivery capabilities of the one or more scent delivery devices from at least one of:
a database or library of scent delivery capabilities for a set of plural types of scent delivery device; and
the one or more scent delivery devices themselves.

15. The method of claim 11, wherein the mapping further comprises mapping the set of input parameters that define the desired olfactory experience to the set of scent stimuli based on a user profile.

16. The method of claim 11, comprising generating the olfactory experience in order to convey particular information to a user, wherein one or more of the conflict resolution method descriptors indicate a manner of modifying a scent stimulus of the set of scent stimuli in the event of a scheduling conflict to maintain the meaning of the scent stimulus when conveying the particular information to the user.

17. The method of claim 16, wherein one or more pieces of information are associated with respective olfactory experiences, and the method comprises:
in response to determining a need to convey one of the pieces of information to the user:
determining that the set of input parameters define the olfactory experience that is associated with the piece of information to be conveyed to the user;
mapping the determined set of input parameters to the set of scent stimuli; and
providing the set of scent delivery instructions that correspond to the set of scent stimuli to the one or more scent delivery devices to deliver the olfactory experience that is associated with the piece of information to the user.

18. A non-transitory computer readable storage medium comprising computer software code which, when executing on a data processing circuit of a data processing system, performs a method of providing scent delivery instructions for generating an olfactory experience, the method comprising:

mapping a set of input parameters that define a desired olfactory experience to a set of scent stimuli, wherein the set of scent stimuli correspond to at least one scent, and wherein the mapping is based on the capabilities of one or more scent delivery devices intended to provide the desired olfactory experience;

providing for scent stimuli of the set of scent stimuli, conflict resolution method descriptors comprising indications of different permitted manners of modifying different ones of the scent stimuli in the event of a scheduling conflict, wherein respective ones of the conflict resolution method descriptors are provided for respective ones of the scent stimuli, and wherein respective ones of the conflict resolution method descriptors comprise one or more of:

an indication for a particular scent stimuli of a temporal shift permitted for that particular scent stimuli; an indication for a particular scent stimuli of a duration reduction permitted for that particular scent stimuli; an indication for a particular scent stimuli of a spatial movement permitted for that particular scent stimuli; and an indication for a particular scent stimuli of a chemical alteration permitted for that particular scent stimuli;

wherein the method further comprises determining the presence of one or more scheduling conflicts in the set of scent stimuli and resolving one or more scheduling conflicts in the set of scent stimuli by, based on the conflict resolution method descriptors, performing one or more of the following conflict resolution actions:

cancelling one or more conflicting scent stimuli; temporally shifting one or more conflicting scent stimuli; reducing the duration of one or more conflicting scent stimuli; spatially moving one or more conflicting scent stimuli; and chemically altering one or more conflicting scent stimuli; and generating a set of scent delivery instructions for the one or more scent delivery devices to follow, wherein the set of scent delivery instructions correspond to the set of scent stimuli after the one or more conflict resolution actions are performed; and providing the set of scent delivery instructions to the one or more scent delivery devices.

19. A system for providing scent delivery instructions for generating an olfactory experience, the system comprising:

an olfactory application for receiving a set of input parameters defining a desired olfactory experience, wherein the set of input parameters includes at least two of:

an indication of one or more desired intensity properties, an indication of one or more desired spatial properties, an indication of one or more desired emotions to invoke in the user, and an indication of one or more desired associations to cause the user to make;

a mapping circuit configured to map the set of input parameters to a set of one or more scent stimuli to provide the desired olfactory experience, and if the set of one or more scent stimuli are not available, to select an available set of one or more scent stimuli based on:

the capabilities of one or more scent delivery devices intended to provide the desired olfactory experience; and a user profile descriptor, wherein the user profile descriptor maps one or more scent stimuli to corresponding perceptual descriptors specific to a user of the system and the perceptual descriptors indicate at least two of:

a perceived intensity value for the scent stimuli that is specific to a user; a perceptual threshold value for the scent stimuli that is specific to a user; one or more natural associations for the scent stimuli that are specific to a user; one or more descriptive keywords for the scent stimuli that are specific to a user; and one or more emotion values for the scent stimuli; and a scent delivery device interface configured to provide a set of scent delivery instructions that correspond to the set of one or more scent stimuli to the one or more scent delivery devices.

20. The system of claim 19, wherein the system is operable for each of the input parameters in the set of input parameters to be a multidimensional measure or vector.

21. A non-transitory computer readable storage medium comprising computer software code which, when executing on a data processing circuit of a data processing system, performs a method of providing scent delivery instructions for generating an olfactory experience, the method comprising:

receiving a set of input parameters defining a desired olfactory experience, wherein the set of input parameters includes at least two of:

an indication of one or more desired intensity properties, an indication of one or more desired spatial properties, an indication of one or more desired emotions to invoke in the user, and an indication of one or more desired associations to cause the user to make;

mapping the set of input parameters to a set of one or more scent stimuli to provide the desired olfactory experience, and if the set of one or more scent stimuli are not available, to select an available set of one or more scent stimuli based on:

the capabilities of one or more scent delivery devices intended to provide the desired olfactory experience; and a user profile descriptor, wherein the user profile descriptor maps one or more scent stimuli to corresponding perceptual descriptors specific to a user of the system and the perceptual descriptors indicate at least two of:

a perceived intensity value for the scent stimuli that is specific to a user; a perceptual threshold value for the scent stimuli that is specific to a user; one or more natural associations for the scent stimuli that are specific to a user; one or more descriptive keywords for the scent stimuli that are specific to a user; and one or more emotion values for the scent stimuli; and providing a set of scent delivery instructions that correspond to the set of one or more scent stimuli to the one or more scent delivery devices.

* * * * *